US010482662B2

(12) United States Patent
Anderson

(10) Patent No.: US 10,482,662 B2
(45) Date of Patent: Nov. 19, 2019

(54) SYSTEMS AND METHODS FOR MIXED REALITY TRANSITIONS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 15/199,519

(22) Filed: Jun. 30, 2016

(65) Prior Publication Data

US 2018/0005441 A1    Jan. 4, 2018

(51) Int. Cl.
*G06T 19/00* (2011.01)
*G06F 3/01* (2006.01)
*A63F 13/216* (2014.01)
*A63F 13/655* (2014.01)
*G02B 27/01* (2006.01)

(52) U.S. Cl.
CPC .......... *G06T 19/006* (2013.01); *A63F 13/216* (2014.09); *A63F 13/655* (2014.09); *G06F 3/011* (2013.01); *A63F 2300/8082* (2013.01); *G02B 27/017* (2013.01); *G02B 2027/014* (2013.01); *G02B 2027/0138* (2013.01)

(58) Field of Classification Search
CPC .............................. G06T 19/006; G06F 3/011
See application file for complete search history.

(56) References Cited

U.S. PATENT DOCUMENTS

| 8,913,085 B2 | 12/2014 | Anderson et al. |
| 9,298,283 B1 | 3/2016 | Lin et al. |
| 2011/0254860 A1* | 10/2011 | Zontrop ............... G06T 19/006 345/633 |
| 2012/0307113 A1 | 12/2012 | Peles et al. |

(Continued)

FOREIGN PATENT DOCUMENTS

| JP | 5832666 B2 | 12/2015 |
| KR | 101574099 B1 | 12/2015 |

(Continued)

OTHER PUBLICATIONS

Bruder, Gerd, et al., "Tuning Self-Motion Perception in Virtual Reality with Visual Illusions", IEEE Transactions on Visualization and Computer Graphics, 18(7), (Jul. 2012), 1068-1078.

(Continued)

*Primary Examiner* — Yi Yang
(74) *Attorney, Agent, or Firm* — Schwegman Lundberg & Woessner, P.A.

(57) ABSTRACT

An immersive video display system includes a video display to display an image and a processor coupled with the video display. The displayed image includes an augmented reality image and a virtual reality image at different moments in time. The processor is to modify one of the augmented reality image and the virtual reality image to more closely correspond to the other of the augmented reality image and the virtual reality image, and control the video display to gradually transition from displaying the one of the augmented reality image and the virtual reality image to the other of the augmented reality image and the virtual reality image.

25 Claims, 9 Drawing Sheets

(56) References Cited

U.S. PATENT DOCUMENTS

| | | | |
|---|---|---|---|
| 2013/0076853 A1* | 3/2013 | Diao | H04N 7/15 |
| | | | 348/14.08 |
| 2013/0290876 A1 | 10/2013 | Anderson et al. | |
| 2014/0092005 A1 | 4/2014 | Anderson et al. | |
| 2014/0292645 A1* | 10/2014 | Tsurumi | G06F 3/011 |
| | | | 345/156 |
| 2014/0292807 A1 | 10/2014 | Raffa et al. | |
| 2014/0309752 A1* | 10/2014 | Yuzurihara | G05B 15/02 |
| | | | 700/13 |
| 2014/0320389 A1* | 10/2014 | Scavezze | G06F 3/011 |
| | | | 345/156 |
| 2014/0361976 A1* | 12/2014 | Osman | G02B 27/0172 |
| | | | 345/156 |
| 2014/0364212 A1 | 12/2014 | Osman et al. | |
| 2015/0070274 A1* | 3/2015 | Morozov | G06F 3/0346 |
| | | | 345/156 |
| 2015/0097867 A1 | 4/2015 | Mcardle et al. | |
| 2015/0123966 A1* | 5/2015 | Newman | G06T 19/006 |
| | | | 345/419 |
| 2016/0116748 A1 | 4/2016 | Carollo et al. | |
| 2016/0299563 A1* | 10/2016 | Stafford | G06F 17/30867 |
| 2016/0314624 A1* | 10/2016 | Li | G06F 1/163 |

FOREIGN PATENT DOCUMENTS

| | | |
|---|---|---|
| WO | WO-2013095393 A1 | 6/2013 |
| WO | WO-2014160776 A1 | 10/2014 |

OTHER PUBLICATIONS

Henry, Daniel, "Spatial Perception in Virtual Environments: Evaluating an Architectural Application", Thesis, Master of Science in Engineering, University of Washington, (1992), 1-107.

Henry, Daniel, et al., "Spatial Perception in Virtual Environments: Evaluating an Architectural Application", 1993 IEEE Virtual Reality Annual International Symposium, (1993).

Suma, Evan A, et al., "Exploiting Change Blindness to Expand Walkable Space in a Virtual Environment", IEEE Virtual Reality Conference (VR), (Mar. 2010), 305-306.

"International Application Serial No. PCT/US2017/027885, International Preliminary Report on Patentability dated Jan. 10, 2019", 10 pgs.

"International Application Serial No. PCT/US2017/027885, International Search Report dated Sep. 18, 2017", 3 pgs.

"International Application Serial No. PCT/US2017/027885, Written Opinion dated Sep. 18, 2017", 8 pgs.

* cited by examiner

SYSTEMS AND METHODS FOR MIXED REALITY TRANSITIONS

TECHNICAL FIELD

Embodiments described herein generally relate to computing, and in particular, to systems and methods for mixed reality transitions.

BACKGROUND

A virtual reality environment presents a viewer with a computer-generated world with which the viewer may interact. Such a virtual reality environment is typically presented to the viewer via a pair of head-mounted displays, one for each eye, that present a three-dimensional (3D) image to the viewer. The head-mounted display also typically includes sensors to sense the viewer's head movements so that the viewer may explore the virtual reality environment by turning the viewer's head in a similar fashion as in the real world. Thus, for example, the viewer may look left or right in the virtual world by turning the viewer's head left or right, respectively.

An augmented reality environment presents a viewer with a limited amount of computer-generated objects that overlay onto the viewer's real-world view. The augmented reality environment may be presented to the viewer also via a pair of head-mounted displays, one for each eye, that present a 3D image to the viewer. The head-mounted displays may be transparent to allow the viewer to optically view the real world while the computer-generated objects are overlaid via the displays, or the head-mounted displays may display live images of the real world captured by video camera mounted proximate the head-mounted displays combined with the computer-generated objects overlaid onto the live images of the real world.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings, in which.

DETAILED DESCRIPTION

Figure 1:
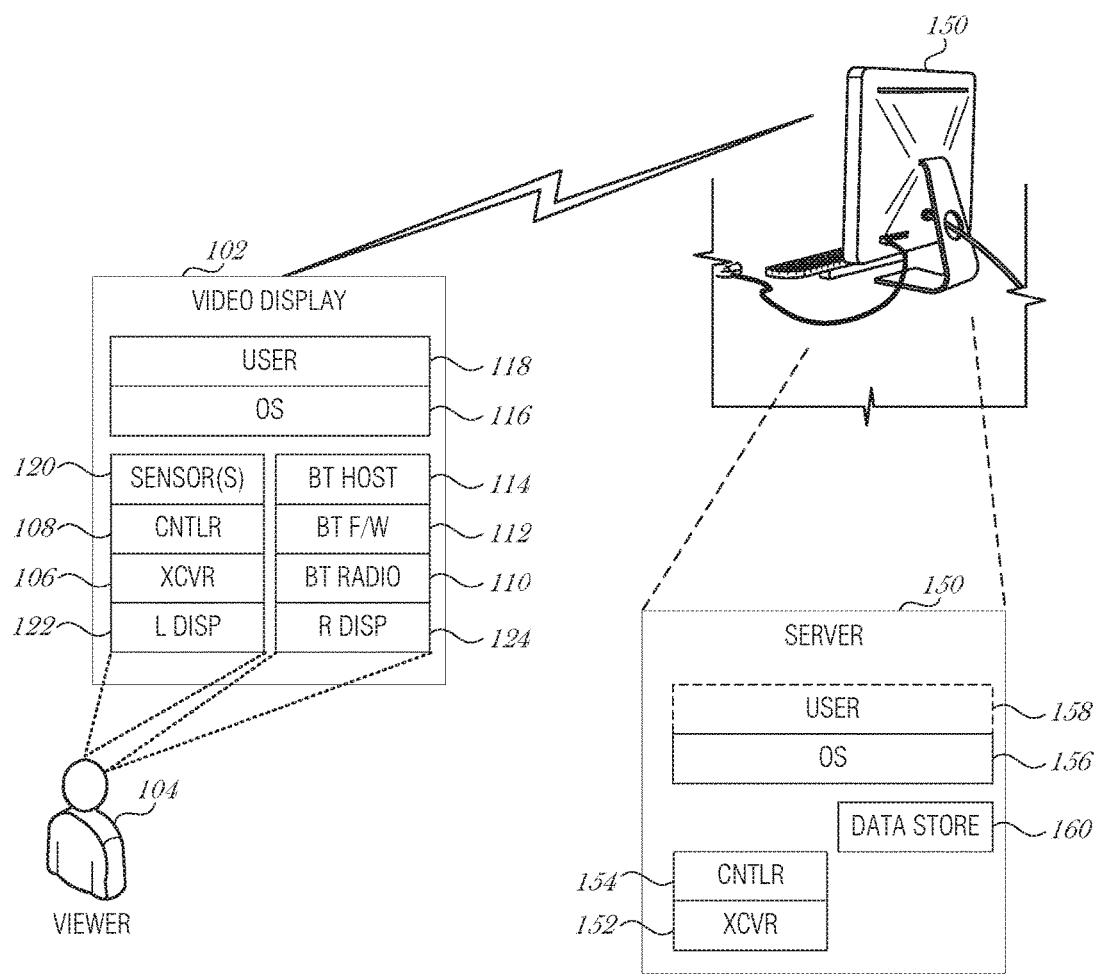
FIG. 1 is a block diagram illustrating an augmented reality/virtual reality system, according to an embodiment.

In the following description, for purposes of explanation, numerous specific details are set forth in order to provide a thorough understanding of some example embodiments. It will be evident, however, to one skilled in the art, that the present disclosure may be practiced without these specific details.

Disclosed herein are systems and methods that provide for mixed reality transitions in an augmented reality/virtual reality (AR/VR) display system. A scene in front of a wearable digital camera may be presented to a viewer by the AR/VR display system in either a virtual reality (VR) display mode or in an augmented reality (AR) display mode. Furthermore, the AR/VR display system may adjust a level of viewer immersion in a VR or AR environment and switch between one of the AR and VR modes to the other of the AR and VR modes based upon various contextual factors, e.g., a context in which the AR/VR display system is being used, changes in the environment, the viewer's activity and schedule, etc. In addition, since the AR/VR display system differentiates between the AR mode and the VR mode for the same scene, the AR/VR display system may make adjustments to the displayed image when transitioning between one of the AR and VR modes to the other of the AR and VR modes in order to make the transition smoother and more natural for the viewer, thereby maintaining a continuity of flow of the viewer's experience.

For example, a viewer may be walking to a train while wearing a headset that is an embodiment of the AR/VR display system. The viewer may be playing an AR game using the headset in which small creatures seem to be flying around in the real-world environment surrounding the viewer. Because the viewer is walking, the AR/VR display system may limit the amount of interaction with the viewer and the amount of immersion that the viewer may experience. When the viewer sits down in the train, and the viewer is more available to concentrate on the game using the AR/VR display system without needing to pay attention to the viewer's environment to walk safely, the AR/VR display system may detect this contextual change. The AR/VR display system may detect this, and perhaps also that no one is sitting nearby the viewer, through the use of a motion detector, a proximity detector, a global positioning system (GPS) location, scene recognition from a set of world-facing digital cameras mounted on the AR/VR display system, a calendar schedule of the viewer, or any combination of these and the like. The AR/VR display system may then transition to a more immersive VR experience for the viewer, for example, a fully immersive VR gaming experience that is not limited to the viewer's surrounding environment within the train. As the viewer nears the train stop at which the viewer will disembark from the train, the AR/VR display system may gradually exit the fully immersive VR gaming experience and begin to add elements of the viewer's surrounding real-world environment to the viewer's experience. The AR/VR display system may adjust the narrative of the VR game or otherwise alter the user experience of the VR game in the process, in order to accommodate a gradual transition from the fully immersive VR mode to the AR mode and maintaining a continuity of flow of the viewer's experience.

FIG. 1 is a block diagram illustrating an AR/VR system 100, according to an embodiment. The AR/VR system 100 may include a video display 102 and a server 150. The AR/VR system 100 may be installed and executed at a local site, such as at an office or home, or installed and executed from a remote site, such as a data center or a cloud service. Portions of the AR/VR system 100 may run locally while other portions may run remotely (with respect to the local elements). The video display 102 may be communicatively coupled with the server 150 via a hardwired connection (e.g., DVI, DisplayPort, HDMI, VGA, Ethernet, USB, FireWire, AV cables, and the like), or via a wireless connection (e.g., Bluetooth, Wi-Fi, and the like).

The video display 102 may include any type of electronic or computing device, including but not limited to a laptop, smartphone, wearable device, tablet, hybrid device, or the like. The video display 102 may include a transceiver 106, capable of both sending and receiving data, and be controlled by a controller 108. The transceiver 106 and controller 108 may be used to communicate over various wireless networks, such as a Wi-Fi network (e.g., according to the IEEE 802.11 family of standards); cellular network, for example, a network designed according to the Long-Term Evolution (LTE), LTE-Advanced, 5G, or Global System for Mobile Communications (GSM) families of standards; or the like.

The video display 102 may include Bluetooth hardware, firmware, and software to enable Bluetooth connectivity according to the IEEE 802.15 family of standards. In an example, the video display 102 includes a Bluetooth radio 110 controlled by Bluetooth firmware 112 and a Bluetooth host 114.

The video display 102 may include a left display monitor 122 to display an image to a left eye of a viewer 104, and a right display monitor 124 to display an image to a right eye of the viewer 104. However, this should not be construed as limiting, as in some embodiments, the video display 102 may include only one video display, which may display both an image associated with the left eye and an image associated with the right eye of the viewer, or may display a two-dimensional (2D) image on a set of display monitors.

The video display 102 may also include a set of sensors 120. The sensors 120 may include a digital still camera or video camera to receive images of the environment adjacent to or surrounding the video display 102 or within a line of sight of the video display 102, e.g., the environment adjacent to or surrounding the viewer 104 or within a line of sight of the viewer 104 when the viewer 104 is using the video display 102. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. The displayed image may be modified to incorporate a representation of the image of the environment within a line of sight of the video display 102.

The sensors 120 may also include a microphone to receive audio of the environment. The sensors 120 may also include a motion detector, e.g., an accelerometer, to detect movement of the video display 102, e.g., movement of the viewer's head when the viewer 104 wears the video display 102 as a head mounted video display. The motion detector may also detect other movements of the viewer 104, e.g., the viewer 104 sitting down, standing up, or head turning. When the viewer 104 is detected as sitting down, the video display 102 may transition from displaying the AR image to the VR image. When the viewer 104 is detected as standing up, the video display 102 may transition from displaying the VR image to the AR image. When the viewer's head is turned, the video display 102 may display a different portion of a virtual or augmented reality environment corresponding to the displayed image consistent with virtually turning a head of a virtual viewer within the virtual or augmented reality environment.

The sensors 120 may also include a proximity sensor to detect proximity of the video display 102 to people or objects in the real-world environment surrounding the video display 102. The sensors 120 may also include one or more of temperature sensors, humidity sensors, light sensors, infrared (IR) sensors, heart rate monitors, vibration sensors, tactile sensors, conductance sensors, etc., to sense the viewer's activities and current state, accept input, and also to sense information about the viewer's environment. Based on whether a person is detected to be adjacent the video display 102 or the viewer 104, the video display 102 may be controlled to gradually transition from displaying one of the augmented reality image and the virtual reality image to the other of the augmented reality image and the virtual reality image. For example, when a person is detected to be adjacent the video display 102 or the viewer 104, the video display 102 may be controlled to gradually transition from displaying the virtual reality image to displaying the augmented reality image, or be prevented from transitioning to display the virtual reality image.

An operating system 116 may interface with the controller 108 and Bluetooth host 114. The operating system 116 may be a desktop operating system, embedded operating system, real-time operating system, proprietary operating system, network operating system, and the like. Examples include, but are not limited to, Windows® NT (and its variants), Windows® Mobile, Windows® Embedded, Mac OS®, Apple iOS, Apple WatchOS®, UNIX, Android™, JavaOS, Symbian OS, Linux, and other suitable operating system platforms.

A communication controller (not shown) may be implemented in hardware, in firmware, or in the operating system 116. The communication controller may act as an interface with various hardware abstraction layer (HAL) interfaces, e.g., device drivers, communication protocol stacks, libraries, and the like. The communication controller is operable to receive user input (e.g., from a system event or by an express system call to the communication controller), and interact with lower-level communication devices (e.g., Bluetooth radio, Wi-Fi radio, cellular radio, etc.) based on the user input. The communication controller may be implemented, at least in part, in a user-level application that makes calls to one or more libraries, device interfaces, or the like in the operating system 116, to cause communication devices to operate in a certain manner.

A user application space 118 on the video display 102 is used to implement user-level applications, controls, user interfaces, and the like, for the viewer 104 to control the video display 102. An application, app, extension, control panel, or other user-level executable software program may be used to control access to the video display 102. For example, an executable file, such as an app, may be installed on the video display 102 and operable to communicate with a host application installed on the server 150.

The server 150 may include an operating system, a file system, database connectivity, radios, or other interfaces to provide an AR/VR system to the video display 102. In particular, the server 150 may include, or be communicatively connected to, a radio transceiver 152 to communicate with the video display 102. A respective controller 154 may control the radio transceiver 152 of the server 150, which in turn may be connected with and controlled via an operating system 156 and user-level applications 158.

In operation, the viewer 104 may interact with an AR environment or VR environment using the video display 102. Details regarding the viewer, the viewer's schedule, and the AR environment or VR environment are stored at the server 150. The server 150 may store the details in a data store 160. The data store 160 may be located at the server 150 or at a remote server (e.g., a database server). The server 150 may provide a reminder to the viewer 104 about the viewer's schedule, such as with a notification or other mechanism. The server 150 may also receive location information from the video display 102, which may be transmitted on a recurring or periodic basis, on demand, or by other means. The location information may be used by the server 150 to determine the location of the video display 102 and inferentially the location of the viewer 104 of the video display 102. Based on the location information, the server 150 may determine details of the viewer's status. Further details are provided in the following figures and description.

Figure 2:
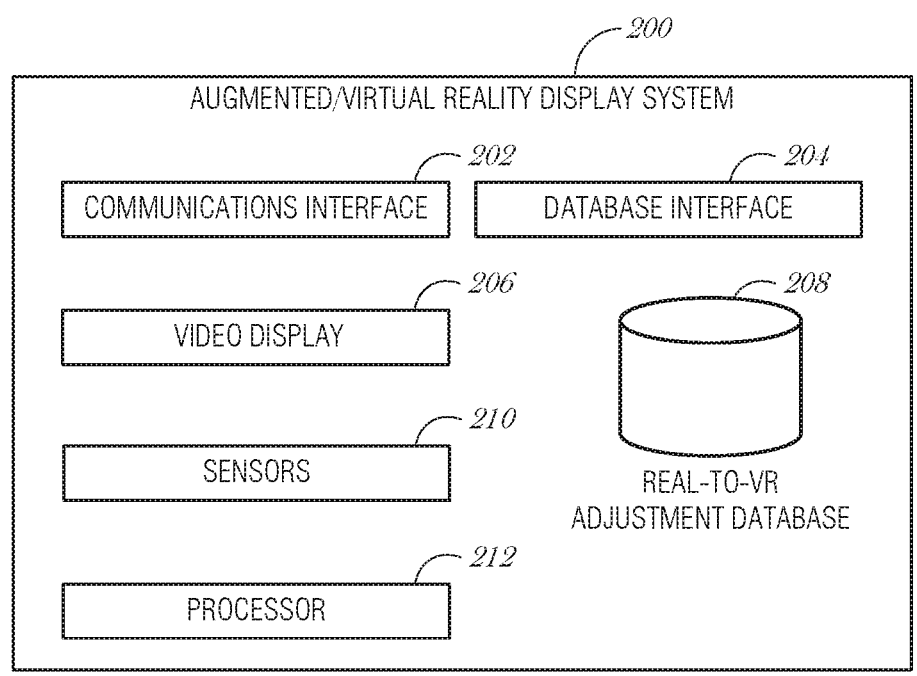
FIG. 2 is a block diagram illustrating an augmented reality/virtual reality display system, according to an embodiment.

FIG. 2 is a block diagram illustrating an AR/VR display system 200, according to an embodiment. The AR/VR system 200 includes a communications interface 202, a database interface 204, a video display 206, sensors 210, and a processor 212. The database interface 204 may be used to access a real-to-VR adjustment database 208, which may be co-located with the AR/VR system 200 or remote from the AR/VR system 200.

The communications interface 202, database interface 204, video display 206, sensors 210, and processor 212 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using circuits, such as with dedicated hardware (e.g., field programmable gate arrays (FPGAs), logic gates, graphics processing units (GPUs), digital signal processors (DSPs), etc.). As such, the tangible entities described herein may be referred to as circuits, circuitry, processor units, subsystems, or the like.

The communications interface 202 may be coupled to a radio transmitter, and be operable to communicate with an embodiment of the server 150, or various other servers and devices external to the AR/VR display system 200, e.g., via the Internet.

The database interface 204 may be configured to access a set of databases to receive data and/or to provide data. The database interface 204 may be configured to access a real-to-VR adjustment database 208 to receive data specifying adjustment amounts for transitioning real-world views, AR views, and VR views between one another. The real-to-VR adjustment database 208 database may include offset directions and amounts for transitioning between displaying the AR image and the VR image. The database interface 204 may also be configured to access data from a location-based database, e.g., a database of parameters regarding places where the AR/VR display system 200 is to be used or a map.

The video display 206 may include a 3D head-mounted video display having one video monitor dedicated to be viewed primarily by one eye and another video monitor dedicated to be viewed primarily by another eye of a viewer of the video display 206. For example, the video display 206 may include a left display monitor to display an image to a left eye of a viewer, and a right display monitor to display an image to a right eye of the viewer. However, this should not be construed as limiting, as in some embodiments, the video display 206 may include only one display monitor, which may display both an image associated with the left eye and an image associated with the right eye of the viewer, or may display a 2D image on a set of display monitors. The video display 206 may display an AR image and a VR image at different moments in time.

The sensors 210 may include a digital camera or video camera to receive images of the environment adjacent to or surrounding the video display 206 or within a line of sight of the video display 206, e.g., the environment adjacent to or surrounding the viewer 104 or within a line of sight of the viewer 104 when the viewer 104 is using the video display 206. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. The displayed image may be modified to incorporate a representation of the image of the environment within a line of sight of the video display 206.

The sensors 210 may also include a microphone to sense audio from the environment. The sensors 210 may transmit the images and/or the audio to the processor 212.

The sensors 210 may also include a motion detector, e.g., an accelerometer, to detect movement of the video display 206, e.g., movement of the viewer 104's head when the viewer 104 wears the video display 206 as a head mounted video display. The motion detector may also detect other movements of the viewer 104, e.g., the viewer 104 sitting down, standing up, or head turning. When the viewer 104 is detected as sitting down, the processor 212 may control the video display 206 to transition from displaying the AR image to the VR image. When the viewer 104 is detected as standing up, the processor 212 may control the video display 206 to transition from displaying the VR image to the AR image. When the viewer's head is turned, the processor 212 may control the video display 206 to display a different portion of a virtual or augmented reality environment corresponding to the displayed image consistent with virtually turning a head of a virtual viewer within the virtual or augmented reality environment.

The sensors 210 may also include a proximity sensor to detect proximity of the video display 206 to people or objects in the real-world environment surrounding the video display 206. The sensors 210 may also include one or more of temperature sensors, humidity sensors, light sensors, heart rate monitors, vibration sensors, tactile sensors, conductance sensors, etc., to sense the viewer's activities and current state, accept input from the viewer 104, and also to sense information about the viewer's environment. Based on whether a person is detected to be adjacent the video display 206 or the viewer 104, the video display 206 may be controlled to gradually transition from displaying one of the augmented reality image and the virtual reality image to the other of the augmented reality image and the virtual reality image. For example, when a person is detected to be adjacent the video display 206 or the viewer 104, the video display 206 may be controlled to gradually transition from displaying the virtual reality image to displaying the augmented reality image, or be prevented from transitioning to display the virtual reality image.

The processor 212 may modify one of the AR image and the VR image when displayed on the video display 206 to more closely correspond to the other of the AR image and the VR image. The processor 212 may also control the video display 206 to transition from displaying the one of the AR image and the VR image to the other of the AR image and the VR image. The gradual transition may include gradually modifying displayed sizes of objects, people, and spaces present in the real-world environment in ways that would reduce disruption of the viewer's perception of flow, continuity, and consistency as the displayed image transitions from one of the VR display and the AR display to the other. These ways may be consistent with differences in a viewer's perceptions of the real-world environment and the VR environment. For example, elements of an environment on which a viewer's attention is not presently focused may change without the viewer noticing. Therefore, the processor 212 may make changes to the VR environment without the viewer noticing by focusing the viewer's attention to other areas of the VR environment than the area that is being changed. The processor 212 may generate activity in a region of the VR environment away from the area of the VR environment that the processor 212 is presently changing in order to make the change to the VR environment without the viewer noticing.

The processor 212 may also receive the image of the environment surrounding the video display 206 from the sensors 210, and modify the image displayed by the video display 206 to incorporate a representation of the image of the environment received from the sensors 210. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104.

Using data received from the sensors 210, e.g., a digital camera or a proximity sensor, the processor 212 may detect whether a person is adjacent a viewer of the video display 206. The processor 212 may also to determine whether to control the video display to gradually transition from displaying one of the augmented reality image and the virtual reality image to the other of the augmented reality image and the virtual reality image based upon whether a person is detected to be adjacent the viewer. For example, based upon a person being detected to be adjacent the viewer, the processor 212 may control the video display to gradually transition from displaying the virtual reality image to the augmented reality image or to prevent transitioning from displaying the augmented reality image to the virtual reality image.

The processor 212 may also modify the image displayed by the video display 206 in response to motion sensed by sensors 210.

The processor 212 may detect and track real-world spaces, objects, and people in the environment surrounding the video display 206 and revise the displayed image accordingly. In particular, the processor 212 may revise a displayed appearance, size, or location of spaces, objects, and people in the displayed image according to the corresponding spaces, objects, and people in the real-world environment.

The processor 212 may look up an offset direction and amount from the real-to-VR adjustment database 208 and apply the looked-up offset direction and amount to the video image displayed by the video display 206, which may be one of an AR image and a VR image, in preparation for transition to the other of the AR image and the VR image. The application of the looked-up offset direction may also be made during the transition. For example, the processor 212 may align a size and location of a background space in the VR image with a corresponding background space in the AR image before or during controlling the video display 206 to transition from displaying the VR image to displaying the AR image. The background space may be a space within a background of the respective image, as would be understood by one of ordinary skill in the art.

For example, the processor 212 may alter an appearance of an aspect of the augmented reality image to correspond with a corresponding aspect of the virtual reality image while controlling the video display to transition from displaying the augmented reality image to displaying the virtual reality image. The aspect of the augmented reality image and the aspect of the virtual reality image may each include an object or a space.

The processor 212 may transition objects in the VR environment into corresponding objects in the real-world environment as the displayed VR image is transitioned to the displayed AR image. For example, as the viewer is transitioning from the VR environment to the AR environment, the processor 212 may detect an object in the vicinity of the viewer using image data received from the sensors 210. The processor 212 may then use the detected object as an anchor point, or visual landmark, for machine vision to use for aligning the VR environment with real-world objects in the AR environment before or while the viewer is transitioning from the VR environment to the AR environment.

Based on image data received from the sensors 210, the processor 212 may add a set of virtual objects or avatars in the VR image that correspond with real-world objects, animals, or people in an environment surrounding the video display that are visible in the AR image before controlling the video display 206 to transition from displaying the VR image to displaying the AR image.

Some characters, objects, or avatars may be assigned to only be presented in one of the VR environment or the AR environment. Furthermore, some characters, objects, or avatars may be assigned to only be presented under certain restricted contexts, whether in the VR environment or the AR environment. The assignments may be made by the viewer's conscious choice through a user interface presented to the viewer by the processor 212, or may be determined automatically by the processor 212 according to characteristics of the characters, objects, or avatars. For example, the viewer may assign virtual birds to the VR environment only, or only to contexts in which the viewer is not performing other activities and is therefore able to concentrate more fully on the VR or AR environment and less on the real-world environment surrounding the viewer. This may be because the viewer may find the virtual birds to be too distracting to be included in the AR environment, which the viewer may use while walking or performing other activities that require a higher level of concentration on the real-world environment around the viewer than being seated in a stable and secure environment to enjoy a fully immersive VR environment experience.

The processor 212 may also alter an appearance of an object or a space in the AR image to correspond with a viewer's perceptions of a corresponding object or space in the VR image before controlling the video display 206 to transition from displaying the AR image to displaying the VR image. For example, the processor 212 may elongate a foreground of the AR image in relation to a point of view in the VR image after controlling the video display 206 to transition from displaying the AR image to displaying the VR image in order to correspond with a viewer's perceptions of space in the VR image. Research has shown that a viewer's perceptions of space in VR environments differ from the viewer's normal experience of reality. In particular, people tend to underestimate the size of virtual spaces in VR environments.

In an embodiment, when the viewer begins viewing the VR environment, e.g., after transitioning from the AR environment, the dimensions of spaces within the VR environment may match the spaces of the AR environment in order to provide a seamless transition for the viewer. However, in order to compensate for the viewer's perceptions of space in VR environments being different from the viewer's normal experience of reality, the dimensions of spaces within the VR environment may be stretched out, for example, by 5%, 10%, 15%, 20%, or 25%, 30%, or other value when the viewer's attention is focused on something other than the spaces that are being stretched out. To focus the attention of the viewer away from the spaces being stretched out so that the viewer doesn't perceive the change, a character may be presented to the viewer to capture the viewer's attention and direct it away from the spaces that are being stretched. The process may then be reversed when the VR environment is later transitioned to the AR environment.

Using data from the sensors 210 and/or data accessed via the database interface 204, e.g., the viewer's location, the viewer's activity, the viewer's posture, the viewer's calendar schedule, and the viewer's state of social interaction, the processor 212 may determine whether context indicates that the displayed image on the video display 206 is about to transition from displaying the one of the AR image and the VR image to the other of the AR image and the VR image. The viewer's state of social interaction may include whether the viewer is adjacent another person or talking with another person. For example, when there are people nearby the viewer or the viewer is talking to people, the viewer may wish to be in an AR environment rather than a VR environment in order to pay attention to the other people and not be too isolated, withdrawn, or unaware of what the other people are doing.

Figure 3:
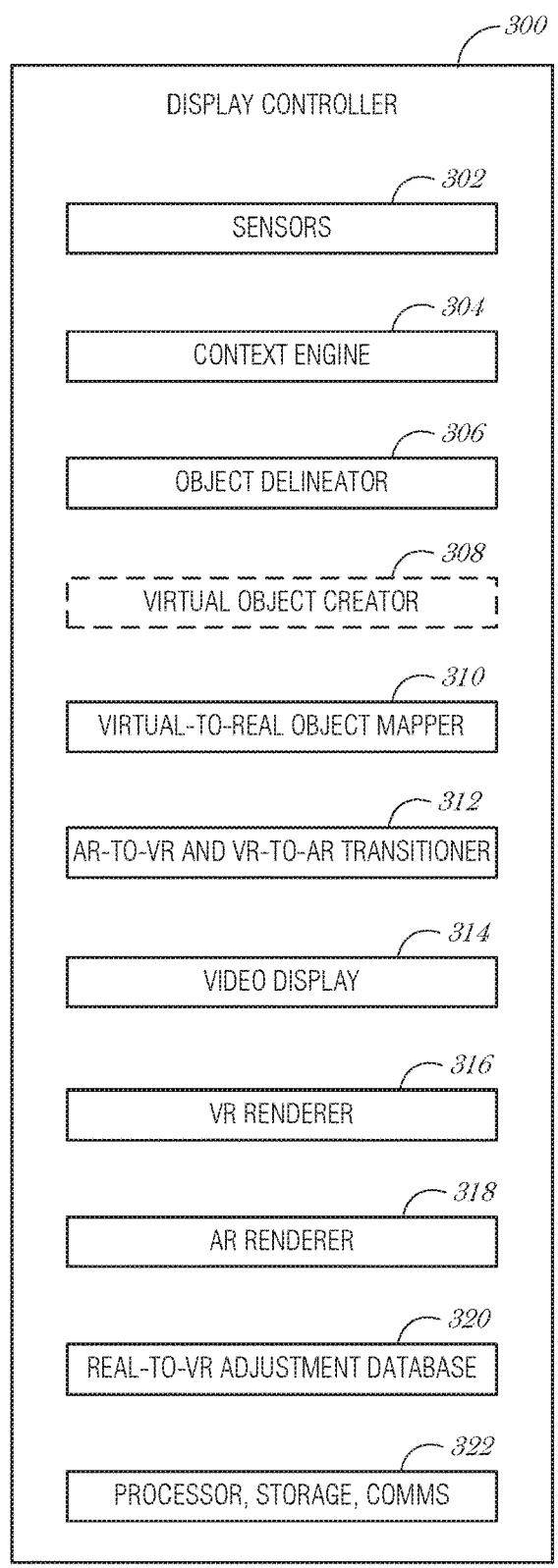
FIG. 3 is a block diagram illustrating a display controller, according to an embodiment.

FIG. 3 is a block diagram illustrating a display controller 300, according to an embodiment. The display controller 300 may be an embodiment of the AR/VR display system 200. The display controller 300 may include a set of sensors 302, a context engine 304, an object delineator 306, an optional virtual object creator 308, a virtual-to-real object mapper 310, an AR-to-VR and VR-to-AR transitioner 312, a video display 314, a VR renderer 316, an AR renderer 318, and a real-to-VR adjustment database 320. The display controller 300 may also include processor, storage, and communications modules 322. The processor, storage, and communications modules 322 may include embodiments of the processor 212, the real-to-VR adjustment database 208, and the communications interface 202 discussed above with respect to FIG. 2. The storage may also include various types of data storage and memory devices as known in the art (e.g., solid state hard drive, magnetic hard drive, flash drive, or other nonvolatile memory systems; or volatile memory systems such as dynamic random access memory (DRAM)).

The display controller 300 may be incorporated into a head-mounted display communicatively coupled with a separate computer system (e.g., a desktop computer, laptop computer, or wearable computer), or may include a complete self-contained head-mounted computer system. In some embodiments, the display controller 300 may be part of a cloud-based system in which processing and/or databases used by the display controller 300 are provided via the cloud, e.g., a data communications network such as the Internet.

The sensors 302 may include a world-facing digital camera and/or video camera to receive images of the environment adjacent to or surrounding the video display 310, e.g., the environment adjacent to or surrounding the viewer when the viewer is using the video display 310. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. The digital camera or video camera may include a 2D camera, 3D camera, infrared camera, and/or depth camera. The sensors 302 may also include a microphone to sense audio from the environment.

The sensors 120 may also include a motion detector, e.g., an accelerometer, to detect movement of the video display 102. e.g., movement of the viewer's head when the viewer 104 wears the video display 102 as a head mounted video display. The sensors 120 may also include a proximity sensor to detect proximity of the video display 102 to people or objects in the real-world environment surrounding the video display 102. The sensors 120 may also include one or more of temperature sensors, humidity sensors, light sensors, heart rate monitors, vibration sensors, tactile sensors, conductance sensors, etc., to sense the viewer's activities and current state, accept input from the viewer, and also to sense information about the viewer's environment.

The context engine 304 may monitor various aspects related to the viewer and the environment to determine a context in which the display controller 300 is operating. The monitored aspects include a schedule of the viewer, location of the viewer, social circumstances (e.g., people nearby the viewer, talking or other social interactions between the viewer and other people), posture of the viewer (e.g., sitting, standing), activity of the viewer (e.g., walking, exercising), etc.

The object delineator 306 may delineate objects within the environment that may also be represented in the VR space. The delineated objects may also include animals and people. In addition, the object delineator 306 may identify the objects that are delineated.

The optional virtual object creator 308 may scan objects in the real-world environment and create VR versions of the real-world objects, hereinafter referred to as virtual objects. In embodiments without the virtual object creator 308, existing 3D virtual object models, for example, those stored in a database, may be relied upon to represent real-world objects in the VR environment without needing to create the virtual objects.

The virtual-to-real object mapper 310 maps virtual objects and spaces in the VR environment to corresponding objects and spaces in the real-world environment. Aspects of the environments that are taken into account in the mapping are the sizes of the spaces, characters that are present or absent in each environment, orientation of the environments and their constituent objects and spaces, and whether or not the real-world environment is in a vehicle. The virtual-to-real object mapper 310 also determines what alterations to objects and spaces should be made in the VR environment to compensate for known perceptual offsets between the real-world environment and the VR environment. These known perceptual offsets include a number of aspects. The purpose of the alterations may be to align the viewer's perceptions of the VR environment closer to reality.

One of these aspects of perceptual offsets is that viewers typically underestimate distances in virtual spaces in VR environments, so a relatively small percentage offset may make spaces in the VR environment more closely match the viewer's expectation of the VR environment. In addition, viewers typically over-estimate distances travelled in VR environments. Another of these aspects of perceptual offsets is that viewers typically expect more gain per unit of input in the VR environment compared to the real-world environment. To compensate for this, the virtual-to-real object mapper 310 may accelerate the expected optic motion presented to the viewer and therefore cover more virtual distance per virtual step as compared to real steps in the real-world environment, e.g., accelerate the viewer's travel in the VR environment. A third aspect of perceptual offsets is a set of illusions typically experienced by the viewer. The presence of absence of visual illusions for motion also vary the optical motion offsets. Optical motion is a perception of motion created by objects in the visual field moving further into the periphery as the viewer moves toward them. Motion illusions and optic flow manipulations may change a viewer's perceptions in VR environments. For example, some illusions include:

1) Layered motion, which is based on the observation that multiple layers of flow fields moving different directions or at different speeds may affect the perception of motional globally.
2) Contour filtering, which exploits approximations of human local feature processing in visual motion perception.
3) Change blindness, which is based on briefly blanking out the viewer's view with interstimulus intervals, which may provoke a contrast inversion of the afterimage.
4) Contrast inversion, which is based on the observation that reversing image contrast affects the output of local motion detectors.

The AR-to-VR and VR-to-AR transitioner 312 may transition the display from one of an AR display and a VR display to the other. For example, information from the context engine 304 and virtual object creator 308 may be processed by the AR-to-VR and VR-to-AR transitioner 312 to transition the displayed image from one of the AR display and the VR display to the other.

The video display 314 may include an augmented display or a fully immersive display. For example, the video display 314 may project an image onto etched, transparent glass through which the viewer views the real-world environment surrounding the viewer.

The VR renderer 316 may generate a graphical rendering of a VR environment, for example, the output from the AR-to-VR and VR-to-AR transitioner 312. The VR renderer 316 may incorporate 3D models of characters and other objects, including those created by the virtual object creator 310.

The AR renderer 318 may generate a graphical rendering of an AR environment, for example, the output from the AR-to-VR and VR-to-AR transitioner 312. The AR renderer 318 may incorporate 3D models of characters and other objects, including those created by the virtual object creator 310.

The real-to-VR adjustment database 320 may store offset directions and amounts as described above with respect to the real-to-VR adjustment database 208. These offset directions are based on the known perceptual offsets discussed with respect to the virtual-to-real object mapper 310. The specific offsets and correction rates for a given application may vary compared to other applications of the display controller 300, and these variations may depend on various factors of the VR environment. For example, a less detailed environment may have a smaller offset than a more detailed environment at least because the availability of optical motion elements would be more limited in the in less detailed environments.

Figure 4:
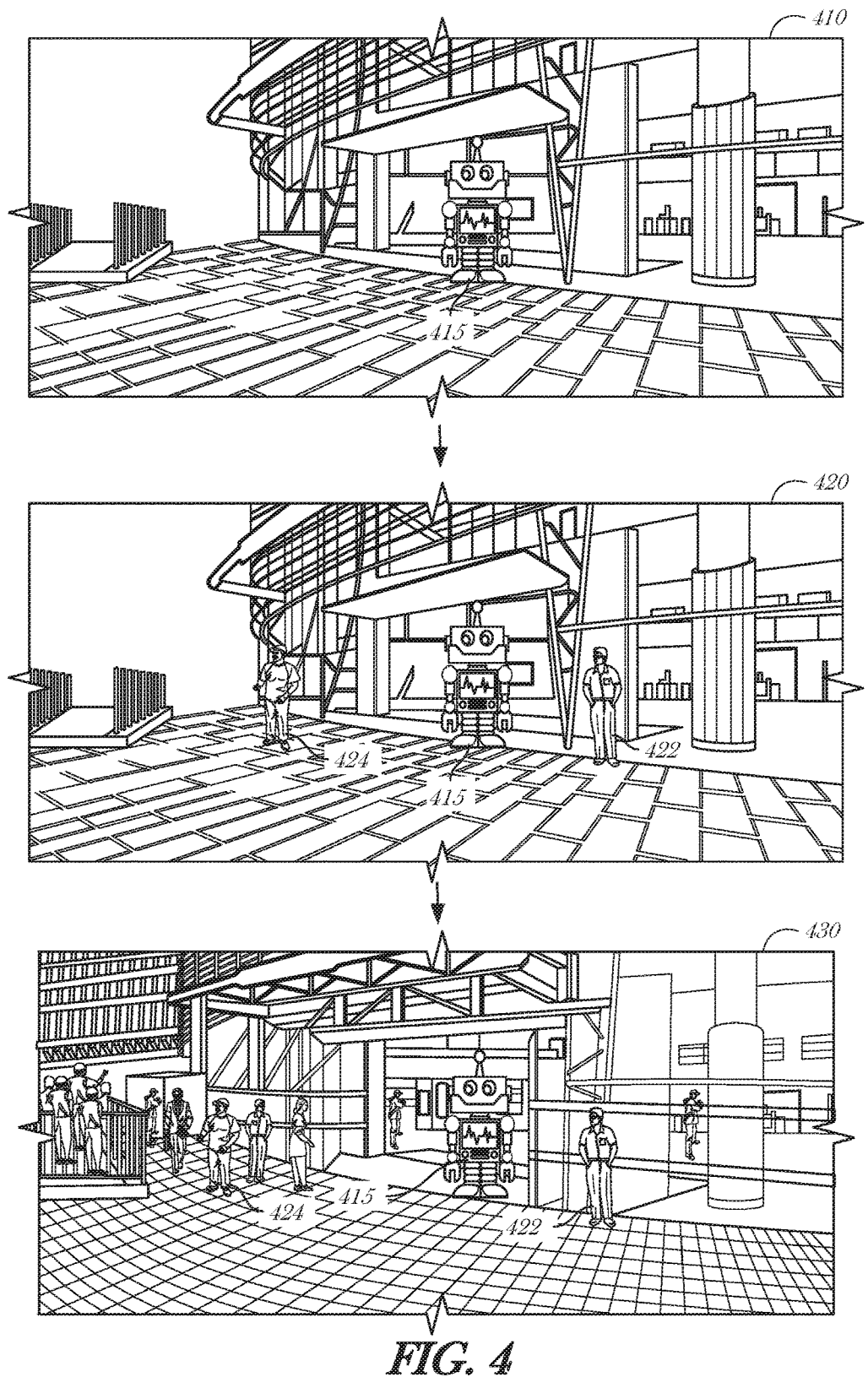
FIG. 4 is a diagram illustrating a transition from a virtual reality representation of a real-world environment to an augmented reality representation of the real-world environment, according to an embodiment.

FIG. 4 is a diagram illustrating a transition from a VR representation 410 of a real-world environment to an AR representation 430 of the real-world environment, according to an embodiment. A robot 415 is presented in both the VR representation 410 and the AR representation 430. To enable a smooth transition between the VR representation 410 and the AR representation 430, an AR/VR display system (e.g., AR/VR system 100, AR/VR display system 200, or display controller 300) may align a size and location of background space in the VR representation 410 with corresponding background space in the AR representation 430. The AR/VR display system may also detect a set of people or objects 422, 424 from the real-world environment and place avatars representing them into a transitioning representation 420 as the VR representation 410 transitions to the AR representation 430. There may be fewer of the avatars placed in the transitioning representation 420 than detected people or objects from the real-world environment, and the avatars may be placed in the transitioning representation 420 at different moments in time as the transition progresses in order to make the transition more gradual and smooth the transition for the viewer's sense of continuity. As the transition is made more gradual, that transition may be more appealing for various storylines and experiences presented through the VR and AR environments.

Figure 5:
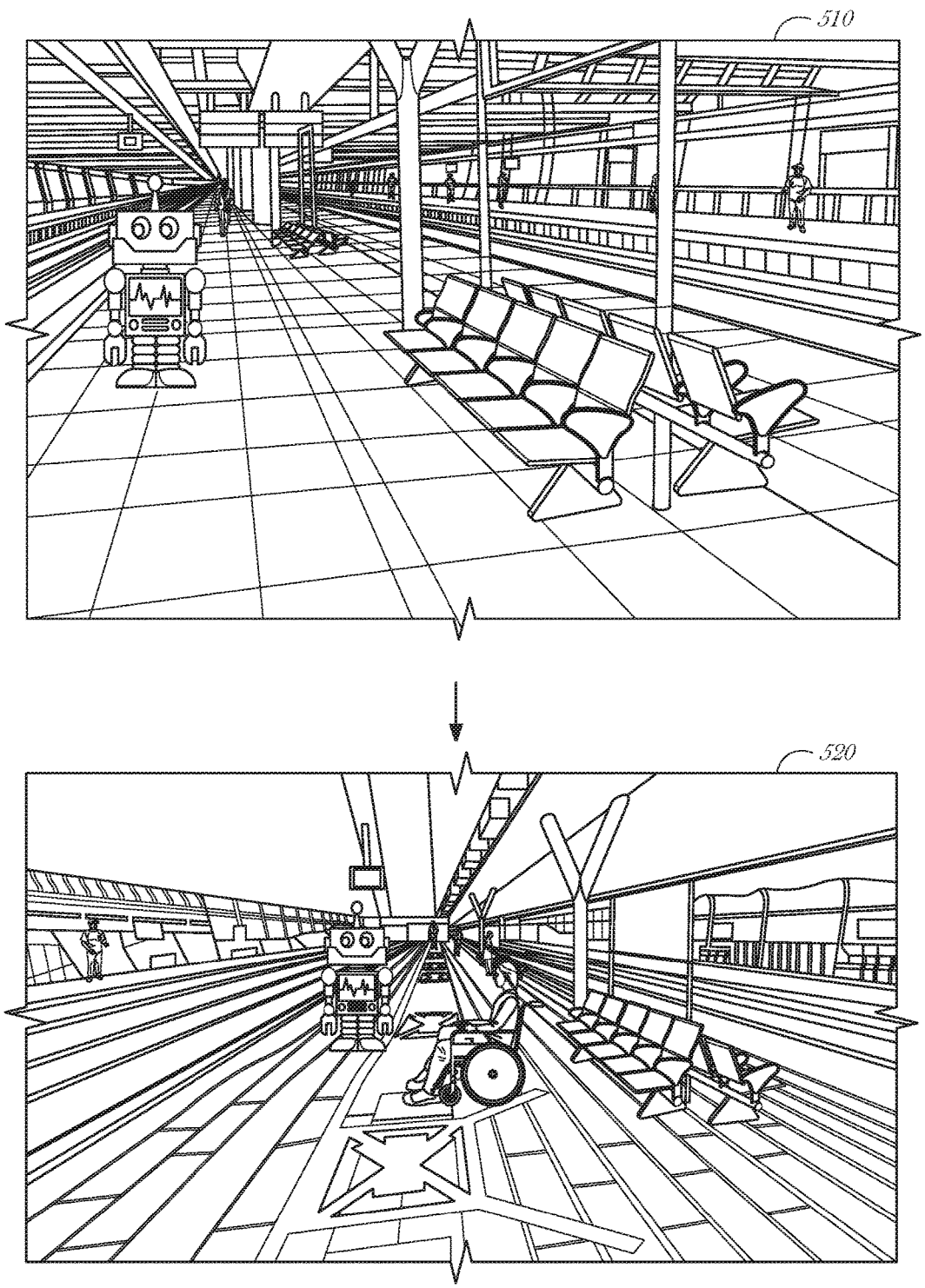
FIG. 5 is a diagram illustrating expansion of spaces within a virtual reality environment to match viewer perceptions of reality as may be experienced in an augmented reality environment, according to an embodiment.

FIG. 5 is a diagram illustrating expansion of spaces within a VR environment 520 to match viewer perceptions of reality as may be experienced in an AR environment 510, according to an embodiment. A viewer may have different perceptions of space within a VR environment compared to a real-world environment or AR environment. For example, the viewer may underestimate a size of space within the VR environment. To compensate for these different perceptions, the VR environment 520 may be modified relative to the AR environment 510 by elongating the foreground of the VR image in accordance with a tendency of people to underestimate spaces within a VR environment. The elongation of the foreground may be performed gradually as the AR environment 510 is transitioned to the VR environment 520. Since some spaces in a VR environment are perceptually larger than corresponding spaces in a real-world environment, the elongated foreground in the VR environment 520 may more closely match the viewer's expectations for a matching environment when transitioning from the AR environment 510 to the VR environment 520.

Differences between a viewer's perception of an AR environment and a VR environment may also be accommodated during the viewer's movement within the VR environment 520 by manipulating the optical flow and other visual cues as the viewer virtually moves through the VR environment 520.

Figure 6:
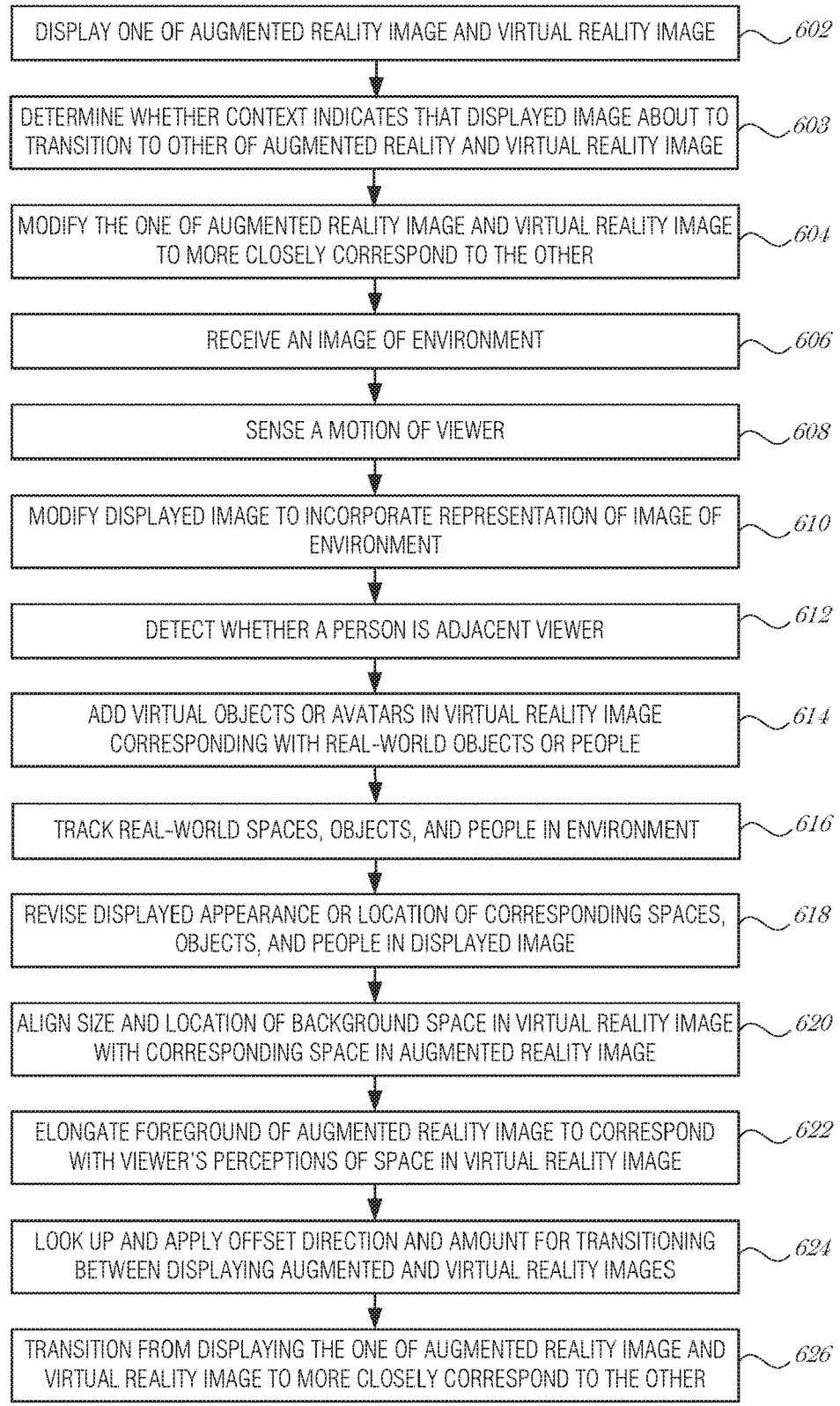
FIG. 6 is a flow chart illustrating a method of transitioning from one of an augmented reality environment and virtual reality environment to the other of the augmented reality environment and virtual reality environment, according to an embodiment.

FIG. 6 is a flow chart illustrating a method 600 of transitioning from one of an AR environment and VR environment to the other of the AR environment and VR environment, according to an embodiment. The order in which the operations of method 600 are presented in FIG. 6 should not be construed as limiting, as the operations of method 600 may be performed in various orders other than those illustrated in FIG. 6, according to the understanding of one of ordinary skill in the art. Operations of method 600 may be similar to and have similar characteristics as similarly named or described operations of other methods discussed herein, e.g., method 700 and method 800.

In an operation 602, one of an AR image and a VR image may be initially displayed on a video display. The AR image and the VR image may be displayed on the video display at different moments in time. The video display may display a 3D image including a left image to be viewed primarily by a left eye of the viewer and a right image to be viewed primarily by a right eye of the viewer, for example, by a head-mounted display.

In an operation 603, it may be determined based upon context whether a near-term transition of the displayed image to the other of the AR image and the VR image is indicated. The context may include at least the viewer's location, the viewer's activity, the viewer's posture, the viewer's calendar schedule, and the viewer's state of social interaction.

In an operation 604, the one of the AR image and the VR image may be modified to more closely correspond to the other of the AR image and VR image that was not initially displayed in operation 602. The modification of operation 604 may be performed repeatedly on subsequent modified images in order to effect a gradual transition from displaying the initially displayed image to the other of the AR image and VR image that was not initially displayed in operation 602. An appearance of an aspect of the one of the AR image and the VR image may be altered to correspond with a corresponding aspect of the other of the AR image and the VR image while transitioning from displaying the one of the AR image and the VR image to the other of the AR image and the VR image. The aspect may include an object or a space, for example.

In an operation 606, an image of a real-world environment adjacent to or surrounding the video display and/or the viewer may be received by a digital camera, e.g., a digital still camera or video camera. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. The image may then be transmitted to a processor for processing.

In an operation 608, a motion of a viewer may be sensed, for example, by processing the image of the environment, by a motion detector, or by an accelerometer. The motion of the viewer may be indirectly sensed by sensing a motion of the video display, e.g., a head-mounted display that is worn on the viewer's head.

In an operation 610, the one of the AR image and VR image that is initially displayed in operation 602 may be modified when displayed on the video display to incorporate a representation of an image of the real-world environment surrounding the video display and/or the viewer. Intermediate displayed images that are displayed after the one initially displayed image or the other of the AR image and VR image that is not initially displayed in operation 602 may also be modified when displayed on the video display to incorporate the representation of an image of the real-world environment surrounding the video display and/or the viewer. The image of the real-world environment may be that obtained by the digital camera in operation 606.

The modification of the one of the AR image and VR image that is initially displayed in operation 602, or the presently displayed image, may be in response to the motion of the viewer sensed in operation 608. The modification of the one of the AR image and VR image that is initially displayed in operation 602, or the displayed image, may include transitioning from displaying the one of the augmented reality image and the virtual reality image to the other of the augmented reality image and the virtual reality image. The sensed motion may include the viewer sitting down, standing up, or head turning. When the sensed motion includes sitting down, for example, modifying the one of the AR image and VR image that is initially displayed in operation 602, or the displayed image, may include transitioning from displaying the augmented reality image to displaying the virtual reality image. When the sensed motion includes standing up, for example, modifying the one of the AR image and VR image that is initially displayed in operation 602, or the displayed image, may include transitioning from displaying the virtual reality image to displaying the augmented reality image, or preventing transitioning to displaying the virtual reality image. When the sensed motion includes turning the viewer's head, modifying the one of the AR image and VR image that is initially displayed in operation 602, or the displayed image, may include displaying a different portion of a virtual or augmented reality environment corresponding to the displayed image consistent with virtually turning a head of a virtual viewer within the virtual or augmented reality environment.

In an operation 612, whether a person is adjacent to the viewer and/or the video display may be detected. The person may be considered to be adjacent to the viewer when the viewer can touch or interact with the person, e.g., when the viewer is seated near another person on a train and can touch that person or have a conversation with that person. The person may be detected from the image of the real-world environment obtained by the digital camera in operation 606, or may be detected by a proximity sensor. Machine vision and/or face recognition may be used to detect the person. Determining whether to gradually transition from displaying the one of the augmented reality image and the virtual reality image to the other may be based upon whether a person is detected to be adjacent to the viewer. For example, In an operation 614, a set of virtual objects or avatars corresponding with real-world objects or people in the real-world environment adjacent or surrounding the video display and/or viewer may be added to the VR image. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104. A set of virtual objects or avatars may also be specified to only be displayed in one of the AR image and the VR image, or only under certain restricted contextual conditions. The specification may be made by the viewer, or may be automatic according to characteristics of the virtual objects or avatars.

In an operation 616, real-world spaces, objects, and/or people may be tracked in the real-world environment adjacent to or surrounding the video display and/or the viewer. The environment may be considered to be adjacent to the viewer 104 when the viewer 104 can touch or interact with the environment, e.g., when the viewer is seated near another person on a train and can touch that person or have a conversation with that person. The environment may also be considered to be surrounding the viewer 104 when the viewer 104 is able to see the environment, e.g., when the environment is within a line of sight of the viewer 104.

In an operation 618, a displayed appearance or location of spaces, objects, and/or people corresponding to the real-world spaces, objects, and/or people tracked in operation 616 may be revised or altered. The revision may be made according to changes in the location and/or size of the tracked real-world spaces, objects, and/or people, to make the displayed appearance more similar to the viewer's perceptions of a corresponding spaces, objects, and/or people in a VR image, or to improve continuity and smoothness of the displayed image as the displayed image is modified in operation 604. For example, an object displayed in the VR image may be aligned with a corresponding real-world object as the displayed image is modified in operation 604.

In an operation 620, a size and location of a background space in a VR image may be aligned with a corresponding space in an AR image. The alignment may be before transitioning from displaying the VR image to displaying the AR image, or during but before the transitioning is complete. In other words, while gradually transitioning from displaying the VR image to displaying the AR image, the size and location of the background space in the VR image may be aligned with the corresponding space in the AR image.

In an operation 622, a foreground of an AR image may be elongated in relation to a point of view in the AR image to correspond with the viewer's perceptions of space in a VR image. The foreground of the AR image may be elongated while the displayed image is modified in operation 604 from an initially displayed AR image to a VR image. In some embodiments, a foreground of the VR image may be elongated in relation to a point of view in the VR image, for example, during or after transitioning from displaying the AR image to displaying the VR image.

In an operation 624, an offset direction and amount for transitioning between displaying an AR image and a VR image may be looked up in a database of offset directions and amounts for transitioning between displaying the AR image and the VR image. The looked-up offset direction and amount may be applied to one of the AR image and the VR image.

In an operation 626, the image displayed on the video display may be gradually transitioned from the initial one of the AR image and VR image to the other of the AR image and VR image that was not initially displayed in operation 602. The transition may be gradual by displaying intermediate images that more closely correspond with the other image than the initial image.

For example, the intermediate images may have objects placed at coordinates closer to the coordinates of the corresponding objects in the other image than the coordinates of the corresponding objects in the initial image, or there may be a higher percentage of objects in the intermediate images that correspond with objects in the other image than in the initial image. Each subsequent intermediate image may more closely correspond to the other image than the previously displayed intermediate images during the transition to displaying the other image. Correspondence may also be determined using image processing techniques that perform a cross-correlation between images to determine a correlation coefficient. The higher the correlation coefficient, the more closely the cross-correlated images correspond with each other.

As another example, the intermediate images may be considered to more closely correspond with the other image than the initial image because the foreground and/or background spaces of the intermediate images overlay the foreground and/or background spaces of the other image with fewer pixels different from one another than the initial image. The intermediate images may be considered to more closely correspond with the other image than the initial image because the foreground and/or background spaces of the intermediate images are stretched to a lesser percentage compared to the other image than the initial image.

Figure 7:
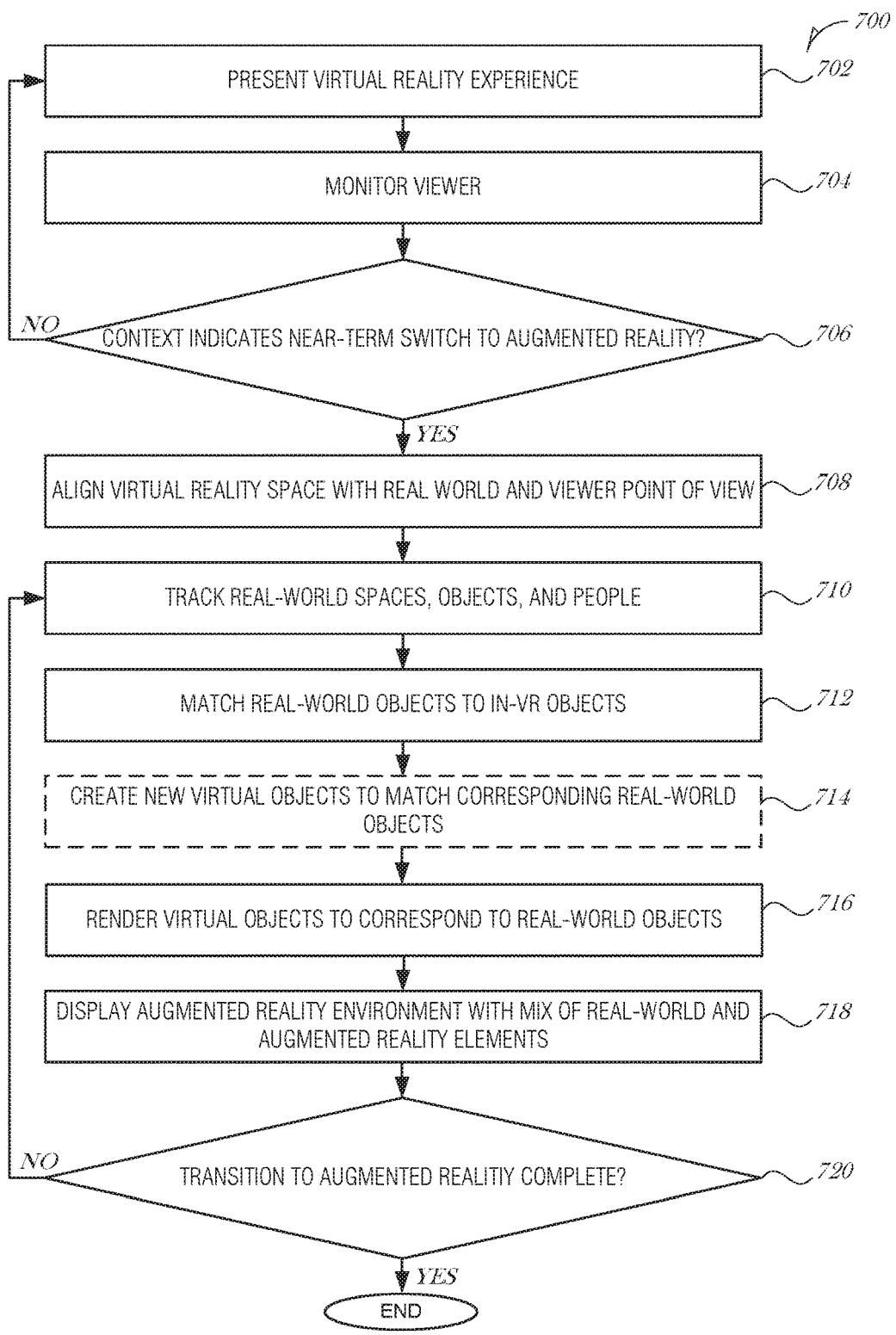
FIG. 7 is a flow chart illustrating a method of transitioning from a virtual reality environment to an augmented reality environment, according to an embodiment.

FIG. 7 is a flow chart illustrating a method 700 of transitioning from a VR environment to an AR environment, according to an embodiment. Operations of method 700 may be similar to and have similar characteristics as similarly named or described operations of other methods discussed herein, e.g., method 600 and method 800.

In an operation 702, a viewer may be presented with a VR experience, for example via a video display.

In an operation 704, the viewer may be monitored.

In an operation 706, a context of the viewer may be analyzed. It may be determined, based on the context, whether a near-term switch to an AR experience is indicated. If not, then operation 702 will again be performed. If so, then the method continues to an operation 708.

In operation 708, a VR space may be aligned with a real-world environment and a point of view of the viewer.

In an operation 710, real-world spaces, objects, and people may be tracked.

In an operation 712, the real-world spaces, objects, and people may be matched to corresponding spaces, objects, and people in the VR environment.

In an optional operation 714, a set of new virtual objects or avatars may be created to match corresponding real-world objects or people. In embodiments in which optional operation 714 is not performed, the virtual objects or avatars may already exist in the AR/VR display system and therefore not need to be created.

In an operation 716, virtual objects or avatars may be rendered to correspond to real-world objects or people.

In an operation 718, the AR environment may be displayed with a mix of real-world and AR elements.

In an operation 720, it may be determined whether the transition from the VR experience to the AR experience is complete. If not, then operation 710 will again be performed. If so, then the method ends.

Figure 8:
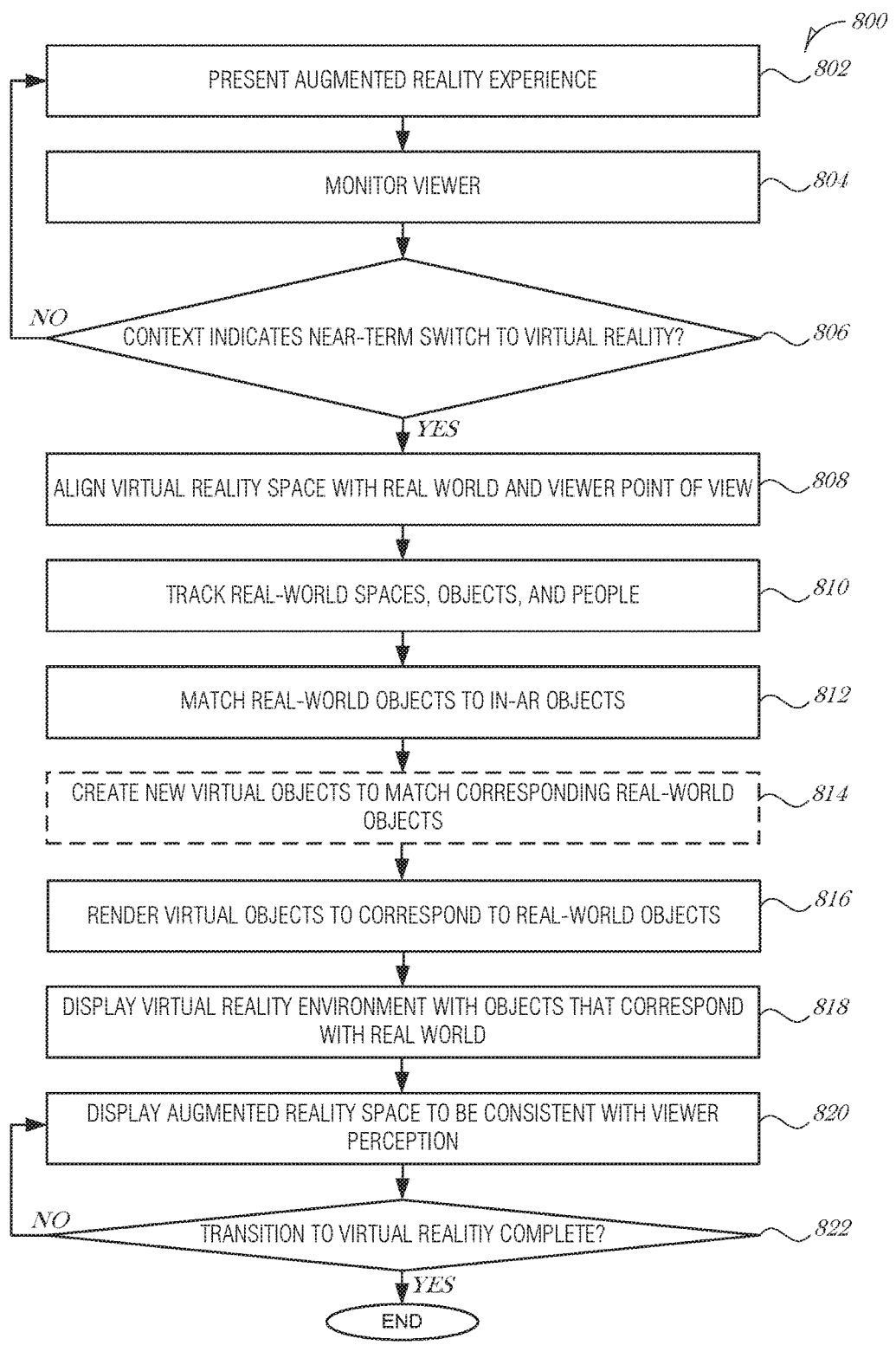
FIG. 8 is a flow chart illustrating a method of transitioning from an augmented reality environment to a virtual reality environment, according to an embodiment.

FIG. 8 is a flow chart illustrating a method 800 of transitioning from an AR environment to a VR environment, according to an embodiment. Operations of method 800 may be similar to and have similar characteristics as similarly named or described operations of other methods discussed herein, e.g., method 600 and method 700.

In an operation 802, a viewer may be presented with an AR experience, for example via a video display.

In an operation 804, the viewer may be monitored, and a context of the viewer may be determined by monitoring the viewer. The context may include the viewer's location, the viewer's activity, the viewer's posture, the viewer's calendar schedule, the viewer's state of social interaction, etc. The viewer's state of social interaction may include whether the viewer is adjacent another person, or whether the viewer is talking with or otherwise interacting with another person.

In an operation 806, a context of the viewer may be analyzed. It may be determined, based on the context, whether a near-term switch to a VR experience is indicated, e.g., whether the AR experience will transition to the VR experience soon. It may be considered to be near-term or soon if the transition will occur within one minute, within two minutes, within three minutes, within four minutes, within five minutes, or other time period that one of ordinary skill in the art would consider to be soon or near-term. If not, then operation 802 will again be performed. If so, then the method continues to an operation 808.

In operation 808, a VR space may be aligned with a real-world environment and a point of view of the viewer.

In an operation 810, real-world spaces, objects, and people may be tracked.

In an operation 812, the real-world spaces, objects, and people may be matched to corresponding spaces, objects, and people in the AR environment.

In an optional operation 814, a set of new virtual objects or avatars may be created to match corresponding real-world objects or people. In embodiments in which optional operation 814 is not performed, the virtual objects or avatars may already exist in the AR/VR display system and therefore not need to be created.

In an operation 816, virtual objects or avatars may be rendered to correspond to real-world objects or people.

In an operation 818, the VR environment may be displayed with the objects that correspond with the real-world environment.

In an operation 820, the AR space may be displayed to be consistent with viewer perception.

In an operation 822, it may be determined whether the transition from the AR experience to the VR experience is complete. If not, then operation 820 will again be performed. If so, then the method ends.

Example 1 is an immersive video display system, the system comprising: a video display to display an image, the image including an augmented reality image and a virtual reality image at different moments in time; and a processor coupled with the video display, the processor to: modify one of the augmented reality image and the virtual reality image to more closely correspond to the other of the augmented reality image and the virtual reality image; and control the video display to gradually transition from displaying the one of the augmented reality image and the virtual reality image to the other of the augmented reality image and the virtual reality image.

In Example 2, the subject matter of Example 1 optionally includes the processor further to display a set of objects in only one of the augmented reality image and the virtual reality image.

In Example 3, the subject matter of any one or more of Examples 1-2 optionally includes wherein the video display is incorporated into a head-mounted video display.

In Example 4, the subject matter of any one or more of Examples 1-3 optionally includes further comprising a motion sensor to sense motion of a viewer of the video display, the processor further to modify the displayed image in response to the sensed motion.

In Example 5, the subject matter of Example 4 optionally includes the modifying of the displayed image including transitioning from displaying the one of the augmented reality image and the virtual reality image to the other of the augmented reality image and the virtual reality image.

In Example 6, the subject matter of any one or more of Examples 4-5 optionally includes wherein the sensed motion includes sitting down.

In Example 7, the subject matter of Example 6 optionally includes the modifying of the displayed image including transitioning from displaying the augmented reality image to displaying the virtual reality image.

In Example 8, the subject matter of any one or more of Examples 4-7 optionally includes wherein the sensed motion includes standing up.

In Example 9, the subject matter of Example 8 optionally includes the modifying of the displayed image including transitioning from displaying the virtual reality image to displaying the augmented reality image.

In Example 10, the subject matter of any one or more of Examples 4-9 optionally includes the sensed motion including turning a head of the viewer.

In Example 11, the subject matter of Example 10 optionally includes the modifying of the displayed image including displaying a different portion of a virtual or augmented reality environment corresponding to the displayed image consistent with virtually turning a head of a virtual viewer within the virtual or augmented reality environment.

In Example 12, the subject matter of any one or more of Examples 1-11 optionally includes further comprising a camera to receive an image of an environment within a line of sight of the video display, the processor further to modify the displayed image to incorporate a representation of the image of the environment within a line of sight of the video display.

In Example 13, the subject matter of Example 12 optionally includes the processor further to detect whether a person is adjacent a viewer of the video display using the camera and to determine whether to control the video display to gradually transition from displaying the one of the augmented reality image and the virtual reality image to the other of the augmented reality image and the virtual reality image based upon whether a person is detected to be adjacent the viewer.

In Example 14, the subject matter of Example 13 optionally includes the processor further to, based upon a person being detected to be adjacent the viewer, control the video display to gradually transition from displaying the virtual reality image to the augmented reality image or to prevent transitioning from displaying the augmented reality image to the virtual reality image.

In Example 15, the subject matter of any one or more of Examples 12-14 optionally includes the processor further to, using the received image of the environment within a line of sight of the video display: track at least one of real-world spaces, objects, and people in the environment within a line of sight of the video display, and revise at least one of a displayed appearance and location of spaces, objects, and people in the displayed image corresponding to the tracked at least one of real-world spaces, objects, and people.

In Example 16, the subject matter of any one or more of Examples 12-15 optionally includes the processor further to detect a real-world object in an environment within a line of sight of the video display, and align a corresponding object in the displayed virtual reality image with the real-world object as the displayed virtual reality image gradually transitions to the displayed augmented reality image.

In Example 17, the subject matter of any one or more of Examples 1-16 optionally includes the processor further to align a size and location of a background space in the virtual reality image with a corresponding background space in the augmented reality image.

In Example 18, the subject matter of any one or more of Examples 1-17 optionally includes the processor further to add a set of virtual objects in the virtual reality image that correspond with real-world objects in an environment within a line of sight of the video display that are visible in the augmented reality image while controlling the video display to transition from displaying the virtual reality image to displaying the augmented reality image.

In Example 19, the subject matter of Example 18 optionally includes wherein the set of virtual objects includes a set of avatars, and wherein the real-world objects include a set of people corresponding to the set of avatars in the set of virtual objects.

In Example 20, the subject matter of any one or more of Examples 1-19 optionally includes the processor further to alter an appearance of an aspect of the augmented reality image to correspond with a corresponding aspect of the virtual reality image while controlling the video display to transition from displaying the augmented reality image to displaying the virtual reality image.

In Example 21, the subject matter of Example 20 optionally includes wherein the aspect of the augmented reality image and the aspect of the virtual reality image each include an object.

In Example 22, the subject matter of any one or more of Examples 20-21 optionally includes wherein the aspect of the augmented reality image and the aspect of the virtual reality image each include a space.

In Example 23, the subject matter of Example 22 optionally includes wherein altering an appearance of a space in the augmented reality image comprises elongating a foreground of the augmented reality image.

In Example 24, the subject matter of any one or more of Examples 1-23 optionally includes the processor further to elongate a foreground of the augmented reality image in relation to a point of view in the augmented reality image while controlling the video display to transition from displaying the augmented reality image to displaying the virtual reality image.

In Example 25, the subject matter of any one or more of Examples 1-24 optionally includes the processor further to elongate a foreground of the virtual reality image in relation to a point of view in the virtual reality image after controlling the video display to transition from displaying the augmented reality image to displaying the virtual reality image.

In Example 26, the subject matter of any one or more of Examples 1-25 optionally includes further including a database of offset directions and amounts for transitioning between displaying the augmented reality image and the virtual reality image, the processor to look up an offset direction and amount from the database of offset directions and amounts and apply the looked-up offset direction and amount to one of the augmented reality image and the virtual reality image.

In Example 27, the subject matter of any one or more of Examples 1-26 optionally includes the processor further to determine whether context indicates a near-term transition from displaying the one of the augmented reality image and the virtual reality image to the other of the augmented reality image and the virtual reality image, the context including at least one of a viewer's location, the viewer's activity, the viewer's posture, the viewer's calendar schedule, and the viewer's state of social interaction.

In Example 28, the subject matter of Example 27 optionally includes wherein the viewer's state of social interaction includes whether the viewer is adjacent another person.

In Example 29, the subject matter of Example 28 optionally includes the processor further to, based upon another person being detected to be adjacent the viewer, determine that context indicates a near-term transition from displaying the virtual reality image to the augmented reality image.

In Example 30, the subject matter of any one or more of Examples 27-29 optionally includes wherein the viewer's state of social interaction includes whether the viewer is talking with another person.

In Example 31, the subject matter of Example 30 optionally includes the processor further to, based upon the viewer being detected to be talking with another person, determine that context indicates a near-term transition from displaying the virtual reality image to the augmented reality image.

Example 32 is a method of transitioning between an augmented reality image and a virtual reality image, the method comprising: displaying an image, the image including one of an augmented reality image and a virtual reality image at different moments in time on a video display; modifying, by a processor, the one of the augmented reality image and the virtual reality image to more closely correspond to the other of the augmented reality image and the virtual reality image; and gradually transitioning from displaying the one of the augmented reality image and the virtual reality image to the other of the augmented reality image and the virtual reality image on the video display.

In Example 33, the subject matter of Example 32 optionally includes displaying a set of objects in only one of the augmented reality image and the virtual reality image.

In Example 34, the subject matter of any one or more of Examples 32-33 optionally includes wherein displaying the image on the video display comprises displaying a 3D image including a left image to be viewed primarily by a left eye and a right image to be viewed primarily by a right eye by a head-mounted video display.

In Example 35, the subject matter of any one or more of Examples 32-34 optionally includes further comprising: sensing, by a motion sensor, a motion of a viewer of the video display; and modifying the one of the augmented reality image and the virtual reality image in response to the sensed motion.

In Example 36, the subject matter of Example 35 optionally includes wherein modifying the one of the augmented reality image and the virtual reality image includes transitioning from displaying the one of the augmented reality image and the virtual reality image to the other of the augmented reality image and the virtual reality image.

In Example 37, the subject matter of any one or more of Examples 35-36 optionally includes wherein the sensed motion includes sitting down.

In Example 38, the subject matter of Example 37 optionally includes wherein modifying the one of the augmented reality image and the virtual reality image includes transitioning from displaying the augmented reality image to displaying the virtual reality image.

In Example 39, the subject matter of any one or more of Examples 35-38 optionally includes wherein the sensed motion includes standing up.

In Example 40, the subject matter of Example 39 optionally includes wherein modifying the one of the augmented reality image and the virtual reality image includes transitioning from displaying the virtual reality image to displaying the augmented reality image.

In Example 41, the subject matter of any one or more of Examples 35-40 optionally includes the sensed motion including turning a head of the viewer.

In Example 42, the subject matter of Example 41 optionally includes wherein modifying the one of the augmented reality image and the virtual reality image includes displaying a different portion of a virtual or augmented reality environment corresponding to the displayed image consistent with virtually turning a head of a virtual viewer within the virtual or augmented reality environment.

In Example 43, the subject matter of any one or more of Examples 32-42 optionally includes further comprising: receiving, via a camera, an image of an environment within a line of sight of the video display; modifying the displayed image to incorporate a representation of the image of the environment within a line of sight of the video display.

In Example 44, the subject matter of Example 43 optionally includes detecting whether a person is adjacent a viewer of the video display using the camera; and determining whether to control the video display to gradually transition from displaying the one of the augmented reality image and the virtual reality image to the other of the augmented reality image and the virtual reality image based upon whether a person is detected to be adjacent the viewer.

In Example 45, the subject matter of Example 44 optionally includes based upon a person being detected to be adjacent the viewer, controlling the video display to gradually transition from displaying the virtual reality image to the augmented reality image or preventing transitioning from displaying the augmented reality image to the virtual reality image.

In Example 46, the subject matter of any one or more of Examples 43-45 optionally includes further comprising, using the received image of the environment within a line of sight of the video display: tracking, by a processor, at least one of real-world spaces, objects, and people in the environment within a line of sight of the video display; and revising, by a processor, at least one of a displayed appearance and location of spaces, objects, and people in the displayed image corresponding to the tracked at least one of real-world spaces, objects, and people.

In Example 47, the subject matter of any one or more of Examples 43-46 optionally includes further comprising: detecting, by a processor, a real-world object in the environment within a line of sight of the video display; and aligning, by a processor, a corresponding object in the displayed virtual reality image with the real-world object while the displayed virtual reality image gradually transitions to the displayed augmented reality image.

In Example 48, the subject matter of any one or more of Examples 32-47 optionally includes further comprising aligning, by a processor, a size and location of a background space in the virtual reality image with a corresponding background space in the augmented reality image.

In Example 49, the subject matter of any one or more of Examples 32-48 optionally includes further comprising adding, by a processor, a set of virtual objects in the virtual reality image that correspond with real-world objects in an environment within a line of sight of the video display that are visible in the augmented reality image while transitioning from displaying the virtual reality image to displaying the augmented reality image.

In Example 50, the subject matter of Example 49 optionally includes wherein the set of virtual objects includes a set of avatars, and wherein the real-world objects include a set of people corresponding to the set of avatars in the set of virtual objects.

In Example 51, the subject matter of any one or more of Examples 32-50 optionally includes further comprising altering, by a processor, an appearance of an aspect of the augmented reality image to correspond with a corresponding aspect of the virtual reality image while transitioning from displaying the augmented reality image to displaying the virtual reality image.

In Example 52, the subject matter of Example 51 optionally includes wherein the aspect of the augmented reality image and the aspect of the virtual reality image each include an object.

In Example 53, the subject matter of any one or more of Examples 51-52 optionally includes wherein the aspect of the augmented reality image and the aspect of the virtual reality image each include a space.

In Example 54, the subject matter of Example 53 optionally includes wherein altering an appearance of a space in the augmented reality image comprises elongating a foreground of the augmented reality image.

In Example 55, the subject matter of any one or more of Examples 32-54 optionally includes further comprising elongating a foreground of the augmented reality image in relation to a point of view in the augmented reality image while transitioning from displaying the augmented reality image to displaying the virtual reality image.

In Example 56, the subject matter of any one or more of Examples 32-55 optionally includes further comprising elongating a foreground of the virtual reality image in relation to a point of view in the virtual reality image after transitioning from displaying the augmented reality image to displaying the virtual reality image.

In Example 57, the subject matter of any one or more of Examples 32-56 optionally includes further comprising: looking up, by a processor, an offset direction and amount from a database of offset directions and amounts for transitioning between displaying the augmented reality image and the virtual reality image: and applying, by a processor, the looked-up offset direction and amount to one of the augmented reality image and the virtual reality image.

In Example 58, the subject matter of any one or more of Examples 32-57 optionally includes further comprising determining whether context indicates a near-term transition from displaying the one of the augmented reality image and the virtual reality image to the other of the augmented reality image and the virtual reality image, the context including at least one of a viewer's location, the viewer's activity, the viewer's posture, the viewer's calendar schedule, and the viewer's state of social interaction.

In Example 59, the subject matter of Example 58 optionally includes wherein the viewer's state of social interaction includes whether the viewer is adjacent another person.

In Example 60, the subject matter of Example 59 optionally includes based upon another person being detected to be adjacent the viewer, determining that context indicates a near-term transition from displaying the virtual reality image to the augmented reality image.

In Example 61, the subject matter of any one or more of Examples 58-60 optionally includes wherein the viewer's state of social interaction includes whether the viewer is talking with another person.

In Example 62, the subject matter of Example 61 optionally includes based upon the viewer being detected to be talking with another person, determining that context indicates a near-term transition from displaying the virtual reality image to the augmented reality image.

Example 63 is at least one machine-readable medium including instructions, which when executed by a machine, cause the machine to perform operations of any of the methods of Examples 32-62.

Example 64 is an apparatus comprising means for performing any of the methods of Examples 32-62.

Example 65 is a system for transitioning between an augmented reality image and a virtual reality image, the system comprising: means for displaying an image, the image including one of an augmented reality image and a virtual reality image at different moments in time on a video display, means for modifying the one of the augmented reality image and the virtual reality image to more closely correspond to the other of the augmented reality image and the virtual reality image; and means for gradually transitioning from displaying the one of the augmented reality image and the virtual reality image to the other of the augmented reality image and the virtual reality image on the displaying means.

In Example 66, the subject matter of Example 65 optionally includes means for displaying a set of objects in only one of the augmented reality image and the virtual reality image.

In Example 67, the subject matter of any one or more of Examples 65-66 optionally includes wherein the means for displaying the image on the displaying means comprises means for displaying a 3D image including a left image to be viewed primarily by a left eye and a right image to be viewed primarily by a right eye by a head-mounted video display.

In Example 68, the subject matter of any one or more of Examples 65-67 optionally includes further comprising: means for sensing a motion of a viewer of the displaying means; and wherein the means for modifying the one of the augmented reality image and the virtual reality image is in response to the sensed motion.

In Example 69, the subject matter of Example 68 optionally includes wherein the means for modifying the one of the augmented reality image and the virtual reality image includes means for transitioning from displaying the one of the augmented reality image and the virtual reality image to the other of the augmented reality image and the virtual reality image.

In Example 70, the subject matter of any one or more of Examples 68-69 optionally includes wherein the sensed motion includes sitting down.

In Example 71, the subject matter of Example 70 optionally includes wherein the means for modifying the one of the augmented reality image and the virtual reality image includes means for transitioning from displaying the augmented reality image to displaying the virtual reality image.

In Example 72, the subject matter of any one or more of Examples 68-71 optionally includes wherein the sensed motion includes standing up.

In Example 73, the subject matter of Example 72 optionally includes wherein the means for modifying the one of the augmented reality image and the virtual reality image includes means for transitioning from displaying the virtual reality image to displaying the augmented reality image.

In Example 74, the subject matter of any one or more of Examples 68-73 optionally includes the sensed motion including turning a head of the viewer.

In Example 75, the subject matter of Example 74 optionally includes wherein the means for modifying the one of the augmented reality image and the virtual reality image includes means for displaying a different portion of a virtual or augmented reality environment corresponding to the displayed image consistent with virtually turning a head of a virtual viewer within the virtual or augmented reality environment.

In Example 76, the subject matter of any one or more of Examples 65-75 optionally includes further comprising: means for receiving an image of an environment within a line of sight of the displaying means: and means for modifying the displayed image to incorporate a representation of the image of the environment within a line of sight of the displaying means.

In Example 77, the subject matter of Example 76 optionally includes means for detecting whether a person is adjacent a viewer of the displaying means using the image receiving means: and means for determining whether to control the display means to gradually transition from displaying the one of the augmented reality image and the virtual reality image to the other of the augmented reality image and the virtual reality image based upon whether a person is detected to be adjacent the viewer.

In Example 78, the subject matter of Example 77 optionally includes means controlling the displaying means to gradually transition from displaying the virtual reality image to the augmented reality image or preventing transitioning from displaying the augmented reality image to the virtual reality image, based upon a person being detected to be adjacent the viewer.

In Example 79, the subject matter of any one or more of Examples 76-78 optionally includes further comprising: means for tracking at least one of real-world spaces, objects, and people in the environment within a line of sight of the displaying means; and means for revising at least one of a displayed appearance and location of corresponding spaces, objects, and people in the displayed image corresponding to the tracked at least one of real-world spaces, objects, and people.

In Example 80, the subject matter of any one or more of Examples 76-79 optionally includes further comprising: means for detecting a real-world object in the environment within a line of sight of the displaying means: and means for aligning a corresponding object in the displayed virtual reality image with the real-world object while the displayed virtual reality image gradually transitions to the displayed augmented reality image.

In Example 81, the subject matter of any one or more of Examples 65-80 optionally includes further comprising means for aligning a size and location of a background space in the virtual reality image with a corresponding background space in the augmented reality image.

In Example 82, the subject matter of any one or more of Examples 65-81 optionally includes further comprising means for adding a set of virtual objects in the virtual reality image that correspond with real-world objects in an environment within a line of sight of the displaying means that are visible in the augmented reality image while transitioning from displaying the virtual reality image to displaying the augmented reality image.

In Example 83, the subject matter of Example 82 optionally includes wherein the set of virtual objects includes a set of avatars, and wherein the real-world objects include a set of people corresponding to the set of avatars in the set of virtual objects.

In Example 84, the subject matter of any one or more of Examples 65-83 optionally includes further comprising means for altering an appearance of an aspect of the augmented reality image to correspond with a corresponding aspect of the virtual reality image while transitioning from displaying the augmented reality image to displaying the virtual reality image.

In Example 85, the subject matter of Example 84 optionally includes wherein the aspect of the augmented reality image and the aspect of the virtual reality image each include an object.

In Example 86, the subject matter of any one or more of Examples 84-85 optionally includes wherein the aspect of the augmented reality image and the aspect of the virtual reality image each include a space, and the means for altering an appearance of an aspect of the augmented reality image includes means for altering an appearance of a space in the augmented reality image.

In Example 87, the subject matter of Example 86 optionally includes wherein the means for altering an appearance of a space in the augmented reality image comprises means for elongating a foreground of the augmented reality image.

In Example 88, the subject matter of any one or more of Examples 65-87 optionally includes further comprising means for elongating a foreground of the augmented reality image in relation to a point of view in the augmented reality image while transitioning from displaying the augmented reality image to displaying the virtual reality image.

In Example 89, the subject matter of any one or more of Examples 65-88 optionally includes further comprising: means for looking up an offset direction and amount from a database of offset directions and amounts for transitioning between displaying the augmented reality image and the virtual reality image; and means for applying the looked-up offset direction and amount to one of the augmented reality image and the virtual reality image.

In Example 90, the subject matter of any one or more of Examples 65-89 optionally includes further comprising means for determining whether context indicates a near-term transition from displaying the one of the augmented reality image and the virtual reality image to the other of the augmented reality image and the virtual reality image, the context including at least one of a viewer's location, the viewer's activity, the viewer's posture, the viewer's calendar schedule, and the viewer's state of social interaction.

In Example 91, the subject matter of Example 90 optionally includes wherein the viewer's state of social interaction includes whether the viewer is adjacent another person.

In Example 92, the subject matter of Example 91 optionally includes means for determining that context indicates a near-term transition from displaying the virtual reality image to the augmented reality image, based upon another person being detected to be adjacent the viewer.

In Example 93, the subject matter of any one or more of Examples 90-92 optionally includes wherein the viewer's state of social interaction includes whether the viewer is talking with another person.

In Example 94, the subject matter of Example 93 optionally includes means for determining that context indicates a near-term transition from displaying the virtual reality image to the augmented reality image, based upon the viewer being detected to be talking with another person.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instructions on the machine-readable medium. The processor subsystem may include one or more processors, each with one or more cores. Additionally, the processor subsystem may be disposed on one or more physical devices. The processor subsystem may include one or more specialized processors, such as a GPU, a DSP, an FPGA, or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term "hardware module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computer, laptop computer, tablet computer, server, smart phone, etc.

Figure 9:
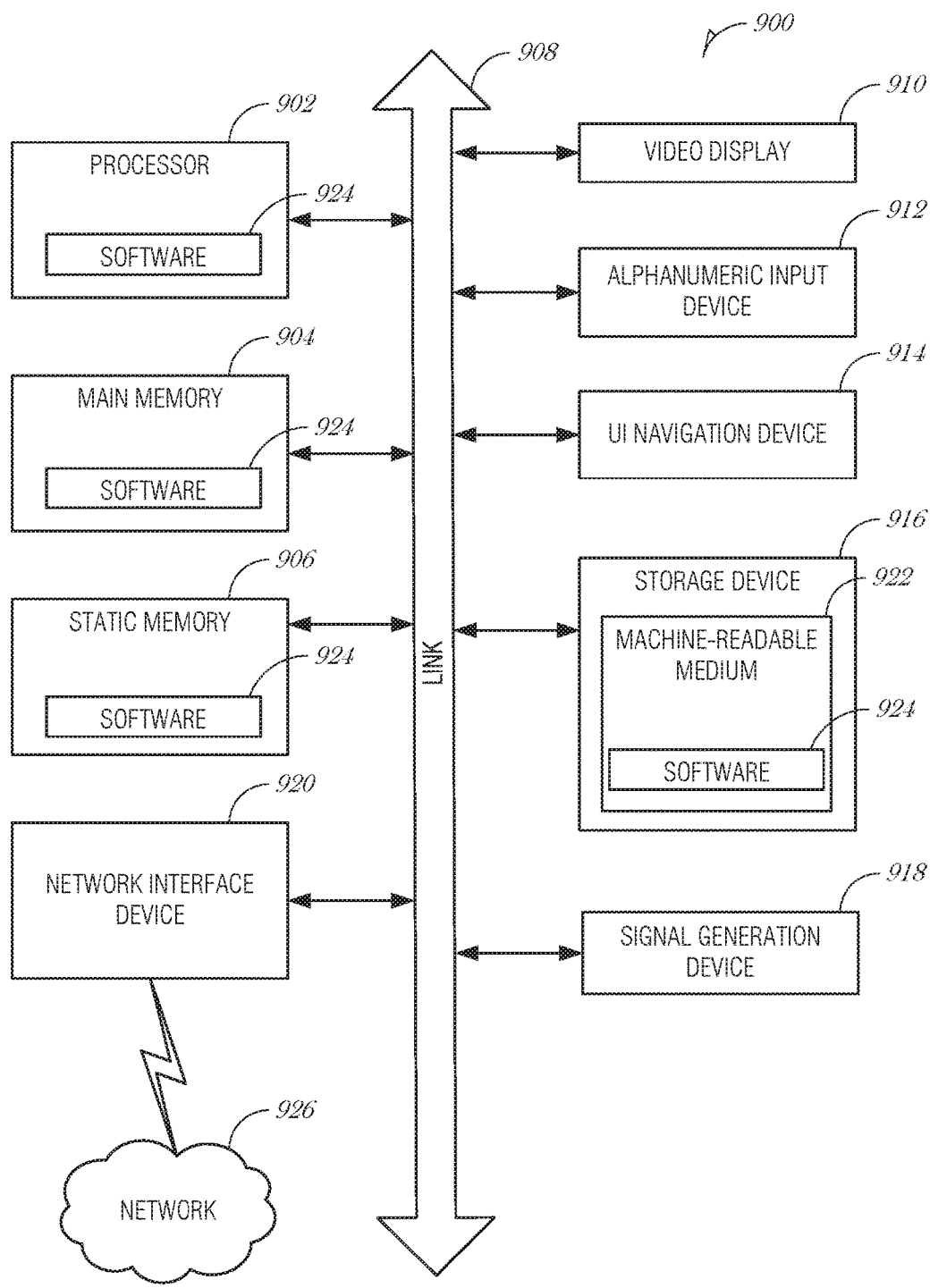
FIG. 9 is an example machine upon which any of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

The computer system 900 includes at least one processor 902 (e.g., a central processing unit (CPU), a GPU, or both, processor cores, compute nodes, etc.), a main memory 904, and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912, and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a GPS sensor, compass, accelerometer, gyrometer, magnetometer, or other sensor.

The storage device 916 includes a machine-readable medium 922 on which is stored one or more sets of data structures and software 924 (e.g., instructions) embodying or utilized by any one or more of the methodologies or functions described herein. The instructions 924 may also reside, completely or at least partially, within the main memory 904, within the static memory 906, and/or within the processor 902 during execution thereof by the computer system 900, with the main memory 904, the static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks: magneto-optical disks: and CD-ROM and DVD-ROM disks.

The instructions 924 may further be transmitted or received over a communication network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. An immersive video display system, the system comprising:
   a video display to display, to a viewer, an augmented reality image in an augmented reality environment, or a virtual reality image in a virtual reality environment; and
   a processor coupled with the video display, the processor to:
      modify the augmented reality image or the virtual reality image to more closely correspond to the other, wherein portions of the virtual reality image are stretched by a percentage when the viewer's attention is focused on non-stretched portions of the virtual reality image, and wherein images in a foreground and background of the virtual reality environment are stretched less than images in an intermediate image based on a correlation coefficient with a higher correlation coefficient results in less stretching and a lower correlation coefficient results in more stretching; and
      control the video display to gradually transition between the augmented reality image and the virtual reality image,
      wherein the processor is to add a set of virtual objects in the virtual reality image that correspond with real-world objects in an environment within a line of sight of the video display that are visible in the augmented reality image while controlling the video display to transition from displaying the virtual reality image to displaying the augmented reality image.

2. The system of claim 1, wherein the video display is incorporated into a head-mounted video display.

3. The system of claim 1, further comprising a motion sensor to sense motion of a viewer of the video display, the processor further to modify the displayed augmented reality or virtual reality image in response to the sensed motion.

4. The system of claim 3, the modifying of the displayed augmented reality or virtual reality image including transitioning from displaying the one of the augmented reality image and the virtual reality image to the other of the augmented reality image and the virtual reality image.

5. The system of claim 1, further comprising a camera to receive an image of the environment within the line of sight of the video display, the processor further to modify the displayed augmented reality or virtual reality image to incorporate a representation of the image of the environment within the line of sight of the video display.

6. The system of claim 5, the processor further to detect whether a person is adjacent a viewer of the video display using the camera and to determine whether to control the video display to gradually transition from displaying the one of the augmented reality image and the virtual reality image to the other of the augmented reality image and the virtual reality image based upon whether a person is detected to be adjacent the viewer.

7. The system of claim 6, the processor further to, based upon a person being detected to be adjacent the viewer, control the video display to gradually transition from displaying the virtual reality image to the augmented reality image or to prevent transitioning from displaying the augmented reality image to the virtual reality image.

8. The system of claim 1, further including a database of offset directions and amounts for transitioning between displaying the augmented reality image and the virtual reality image, the processor to look up an offset direction and amount from the database of offset directions and amounts and apply the looked-up offset direction and amount to one of the augmented reality image and the virtual reality image.

9. The system of claim 1, the processor further to determine whether context indicates a near-term transition from displaying the one of the augmented reality image and the virtual reality image to the other of the augmented reality image and the virtual reality image, the context including at least one of a viewer's location, the viewer's activity, the viewer's posture, the viewer's calendar schedule, and the viewer's state of social interaction.

10. A method of transitioning between an augmented reality image and a virtual reality image, the method comprising:
    displaying, to a viewer, an augmented reality image in an augmented reality environment, or a virtual reality image in a virtual reality environment on a video display;
    modifying, by a processor, either the augmented reality image or the virtual reality image to more closely correspond to the other, wherein portions of the virtual reality image are stretched by a percentage when the viewer's attention is focused on non-stretched portions of the virtual reality image to provide perceptual compensation, and wherein images in a foreground and background of the virtual reality environment are stretched less than images in an intermediate image based on a correlation coefficient with a higher correlation coefficient results in less stretching and a lower correlation coefficient results in more stretching;
    gradually transitioning between the augmented reality environment and the virtual reality environment by modifying the display of the augmented reality image or the virtual reality image to the other on the video display; and
    adding a set of virtual objects in the virtual reality image that correspond with real-world objects in an environment within a line of sight of the video display that are visible in the augmented reality image while transitioning from displaying the virtual reality image to displaying the augmented reality image.

11. The method of claim 10, further comprising:
    sensing, by a motion sensor, a motion of a viewer of the video display, wherein the sensed motion includes sitting down; and
    modifying the one of the augmented reality image and the virtual reality image in response to the sensed motion.

12. The method of claim 11, wherein modifying the one of the augmented reality image and the virtual reality image includes transitioning from displaying the augmented reality image to displaying the virtual reality image.

13. The method of claim 10, further comprising:
    sensing, by a motion sensor, a motion of a viewer of the video display, wherein the sensed motion includes standing up; and modifying the one of the augmented reality image and the virtual reality image in response to the sensed motion.

14. The method of claim 13, wherein modifying the one of the augmented reality image and the virtual reality image includes transitioning from displaying the virtual reality image to displaying the augmented reality image.

15. The method of claim 10, further comprising:
sensing, by a motion sensor, a motion of a viewer of the video display, wherein the sensed motion includes turning a head of the viewer; and
modifying the one of the augmented reality image and the virtual reality image in response to the sensed motion, wherein modifying the one of the augmented reality image and the virtual reality image includes displaying a different portion of a virtual or augmented reality environment corresponding to the displayed augmented reality or virtual reality image consistent with virtually turning a head of a virtual viewer within the virtual or augmented reality environment.

16. The method of claim 10, further comprising:
receiving, via a camera, an image of the environment within the line of sight of the video display;
modifying the displayed augmented reality or virtual reality image to incorporate a representation of the image of the environment within a line of sight of the video display; tracking, by a processor, at least one of real-world spaces, objects, and people in the environment within the line of sight of the video display, using the received image of the environment; and
revising, by a processor, at least one of a displayed appearance and location of spaces, objects, and people in the displayed augmented reality or virtual reality image corresponding to the tracked at least one of real-world spaces, objects, and people, using the received image of the environment.

17. The method of claim 10, further comprising:
receiving, via a camera, an image of the environment within the line of sight of the video display;
modifying the displayed augmented reality or virtual reality image to incorporate a representation of the image of the environment within the line of sight of the video display;
detecting, by a processor, a real-world object in the environment within the line of sight of the video display; and
aligning, by a processor, a corresponding object in the displayed virtual reality image with the real-world object while the displayed virtual reality image gradually transitions to the displayed augmented reality image.

18. The method of claim 10, further comprising:
looking up, by a processor, an offset direction and amount from a database of offset directions and amounts for transitioning between displaying the augmented reality image and the virtual reality image; and
applying, by a processor, the looked-up offset direction and amount to one of the augmented reality image and the virtual reality image.

19. The method of claim 10, further comprising determining, by a processor, whether context indicates a near-term transition from displaying the one of the augmented reality image and the virtual reality image to the other of the augmented reality image and the virtual reality image, the context including at least one of a viewer's location, the viewer's activity, the viewer's posture, the viewer's calendar schedule, and the viewer's state of social interaction.

20. At least one non-transitory machine-readable medium including instructions, which when executed by a machine, cause the machine to perform operations comprising:
displaying, to a viewer, an augmented reality image in an augmented reality environment, or a virtual reality image in a virtual reality environment on a video display;
modifying either the augmented reality image or the virtual reality image to more closely correspond to the other, wherein portions of the virtual reality image are stretched by a percentage when the viewer's attention is focused on non-stretched portions of the virtual reality image to provide perceptual compensation, and wherein images in a foreground and background of the virtual reality environment are stretched less than images in an intermediate image based on a correlation coefficient with a higher correlation coefficient results in less stretching and a lower correlation coefficient results in more stretching;
gradually transitioning between the augmented reality environment and the virtual reality environment by modifying the display of the augmented reality image or the virtual reality image to the other on the video display; and
adding a set of virtual objects in the virtual reality image that correspond with real-world objects in an environment within a line of sight of the video display that are visible in the augmented reality image while transitioning from displaying the virtual reality image to displaying the augmented reality image.

21. The non-transitory machine-readable medium of claim 20, further comprising aligning, by a processor, a size and location of a background space in the virtual reality image with a corresponding background space in the augmented reality image.

22. The non-transitory machine-readable medium of claim 20, further comprising adding, by a processor, a set of virtual objects in the virtual reality image that correspond with real-world objects in the environment within the line of sight of the video display that are visible in the augmented reality image while transitioning from displaying the virtual reality image to displaying the augmented reality image.

23. The non-transitory machine-readable medium of claim 20, further comprising altering, by a processor, an appearance of an aspect of the augmented reality image to correspond with a corresponding aspect of the virtual reality image while transitioning from displaying the augmented reality image to displaying the virtual reality image.

24. The non-transitory machine-readable medium of claim 20, further comprising elongating, by a processor, a foreground depth of the augmented reality image in relation to a point of view in the augmented reality image while transitioning from displaying the augmented reality image to displaying the virtual reality image.

25. The non-transitory machine-readable medium of claim 20, further comprising elongating, by a processor, a foreground depth of the virtual reality image in relation to a point of view in the virtual reality image after transitioning from displaying the augmented reality image to displaying the virtual reality image.

* * * * *

UNITED STATES PATENT AND TRADEMARK OFFICE
CERTIFICATE OF CORRECTION

PATENT NO. : 10,482,662 B2
APPLICATION NO. : 15/199519
DATED : November 19, 2019
INVENTOR(S) : Glen J. Anderson It is certified that error appears in the above-identified patent and that said Letters Patent is hereby corrected as shown below:

In the Claims

Column 31, Line 26, Claim 16, after "display;", insert --¶--

Signed and Sealed this
Fourteenth Day of July, 2020

Andrei Iancu
*Director of the United States Patent and Trademark Office*